(12) United States Patent
Inami et al.

(10) Patent No.: US 7,426,482 B2
(45) Date of Patent: Sep. 16, 2008

(54) IMAGE PROCESSING APPARATUS, METHOD OF PLACING ORDER FOR EXPENDABLES OF IMAGE PROCESSING APPARATUS, STORAGE MEDIUM, AND PROGRAM

(75) Inventors: Satoru Inami, Shizuoka (JP); Masanobu Saito, Shizuoka (JP); Seiichi Shinohara, Shizuoka (JP); Takayuki Namiki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 10/225,244

(22) Filed: Aug. 22, 2002

(65) Prior Publication Data

US 2003/0040984 A1    Feb. 27, 2003

(30) Foreign Application Priority Data

Aug. 23, 2001  (JP) ............................. 2001-252918
Jul. 23, 2002   (JP) ............................. 2002-214011

(51) Int. Cl.
    *G06Q 15/10*   (2006.01)
(52) U.S. Cl. ......................................... 705/26; 705/28
(58) Field of Classification Search .................. 705/26, 705/28
    See application file for complete search history.

(56) References Cited

U.S. PATENT DOCUMENTS

| | | | |
|---|---|---|---|
| 5,305,199 A * | 4/1994 | LoBiondo et al. ............. 705/28 |
| 5,909,604 A   | 6/1999 | Arai |
| 6,023,593 A * | 2/2000 | Tomidokoro .................... 399/8 |
| 6,233,409 B1* | 5/2001 | Haines et al. .................. 399/10 |
| 6,791,708 B1* | 9/2004 | Yamamoto .................. 358/1.18 |
| 6,985,241 B1* | 1/2006 | Haines et al. ............... 358/1.14 |
| 6,985,877 B1* | 1/2006 | Hayward et al. .............. 705/27 |
| 7,228,289 B2* | 6/2007 | Brumfield et al. ............. 705/35 |
| 2002/0172520 A1* | 11/2002 | Suyehira ...................... 399/24 |

FOREIGN PATENT DOCUMENTS

| | | |
|---|---|---|
| JP | 7-239825   | 9/1995 |
| JP | 8-315052   | 11/1996 |
| JP | 09-188042  | 7/1997 |
| JP | 11-003005  | 1/1999 |
| JP | 11-102147  | 4/1999 |
| JP | 11-338323  | 12/1999 |
| JP | 2001-228760| 8/2001 |

* cited by examiner

*Primary Examiner*—F. Zeender
*Assistant Examiner*—Garcia Ade
(74) *Attorney, Agent, or Firm*—Fitzpatrick, Cella, Harper & Scinto

(57) ABSTRACT

In an image processing apparatus that includes an order placement means for executing an operation associated with order placement of an expendable used in an image forming apparatus, data associated with image formation is accumulated to have a timing associated with order placement as a trigger, and the operation of the order placement means is controlled on the basis of the accumulated value. In this manner, redundant orders for expendables can be prevented.

19 Claims, 18 Drawing Sheets

FIG. 15A

HAVE YOU CONFIRMED STOCK
COUNT OF EXPENDABLE ?

NEXT

FIG. 15B

DO YOU PLACE ORDER FOR EXPENDABLE AGAIN
ALTHOUGH NOT LONG AFTER PREVIOUS ORDER ?

YES      NO

| BASIC SETUP | PAPER SETUP | LAYOUT | UTILITY | ORDER PLACEMENT |

1001 — ☑ ENABLE THIS ORDER PLACEMENT SHEET WINDOW

PRINTER PRODUCT NAME          LBP-10000   ~1007
TONER CARTRIDGE PRODUCT NAME  EP-ABC      ~1008
ORDER QUANTITY                3           ~1004

DESTINATION
NAME : ○○○○
ADDRESS : ××××
TEL : △△△△
E-mail : □□@□□

[ORDER CONTENT CONFIRMATION]  [CANCEL]  [DETAIL SETUP]

DETAIL SETUP

STOCK SETUP
STOCK COUNT            4    ~1005
STOCK THRESHOLD VALUE  1    ~1006

ORDER PLACEMENT IS PERMITTED WHEN STOCK COUNT BECOMES EQUAL TO OR SMALLER THAN SETUP VALUE

ORDER DESTINATION
○×○△    SERVICE CENTER
E-mail  △×@○△

[OK]                [CANCEL]

FIG. 18

| TYPE | COUNT VALUE |
|------|-------------|
| Y    | 165000      |
| M    | 250000      |
| C    | 345         |
| K    | 2800        |

IMAGE PROCESSING APPARATUS, METHOD OF PLACING ORDER FOR EXPENDABLES OF IMAGE PROCESSING APPARATUS, STORAGE MEDIUM, AND PROGRAM

FIELD OF THE INVENTION

The present invention relates to an image processing apparatus, a method of placing an order for expendables (or consumable) of an image processing apparatus, a storage medium, and a program and, more particularly, to an image processing apparatus that can place an order for expendables in each apparatus, a method of placing an order for expendables (consumable supplies) of an image processing apparatus, a storage medium, and a program.

BACKGROUND OF THE INVENTION

As information output apparatuses for image processing apparatuses such as a wordprocessor, personal computer, facsimile apparatus, and the like, image forming apparatuses that record information such as desired characters, images, and the like on sheet-like recording media such as paper sheets, films, and the like in accordance with electrophotography are prevalently used.

Such image forming apparatuses use developing agents such as toners, inks, and the like to form images on recording media. For this reason, the user must purchase and replace cartridges that store developing agents, and developing devices, or process cartridges that integrate charging devices, photosensitive drums, and developing devices as expendables.

In order to reduce the load on the user upon purchasing expendables, for example, order placement systems have been proposed, as described in Japanese Patent Laid-Open Nos. 7-239825, 8-315052, and the like.

In such system, when an image forming apparatus main body recognizes that the remaining amount of toner or ink as an expendable runs short, it automatically places an order to the order-receiving side via a facsimile apparatus connected to a network. In recent years, since the Internet has prevailed, a method of accessing a home page on the order-receiving side on the Internet via a line, and placing an order for expendables has been proposed.

In this manner, since the user can place an order for expendables on a computer that he or she uses, he or she need not go to a nearby expendable retailer or can be prevented from forgetting to purchase. Hence, such system is very effective in terms of usability.

The aforementioned order placement system is launched upon detecting that the remaining amount of toner or ink runs short (to be also referred to remaining amount detection hereinafter). As detection methods, a detection method based on a change in capacitance of toner, a method of detecting the level of toner in a toner container by receiving light emitted by an LED or the like by a light-receiving sensor via the toner, a detection method based on a change in torque of a toner stirring means, and the like are known.

When the remaining amount detection has been made by such method, an alarm "toner Low" or the like is displayed on the image forming apparatus main body or the screen of a host such as a personal computer or the like, which is connected to the image forming apparatus main body, so as to inform the user of it.

When the expendable is toner, the aforementioned remaining amount detection method detects if the toner remaining at a predetermined position becomes equal to or smaller than a predetermined amount, and toner often locally remains at another location in a cartridge or toner container in practice. When the alarm "toner Low" is displayed for the first time, the toner remaining amount of the entire cartridge is still large enough to print.

Hence, the user does not normally replace a cartridge or the like by another at that time. In such case, the user temporarily detaches the cartridge from the image forming apparatus main body, shakes it to the right and left, and attaches the cartridge in the image forming apparatus main body again, so as to effectively use toner that remains in the cartridge.

As a result, the toner that remains at another location temporarily cancels the alarm "toner Low" or the like, and the apparatus is ready to print again. After some print processes, the alarm "toner Low" or the like is displayed again by the remaining amount detection.

In this manner, since the aforementioned operation is repeated until toner in one cartridge is used up, the remaining amount detection is repeated several times, and the alarm "toner Low" or the like is displayed several times.

For this reason, if the number of times of remaining amount detection is not recognized, the order placement system may be repetitively launched to place an order every detection.

Hence, in order to prevent expendables from being ordered repetitively, once an order for an expendable is placed, a history is stored or a flag is set in a storage means provided to a process cartridge, and the order placement system is not launched repetitively or does not place a redundant order by referring to the history or flag in the storage means, as has been proposed in U.S. Pat. No. 6,233,409, and Japanese Patent Laid-Open No. 11-338323.

However, according to the description of the specification of U.S. Pat. No. 6,233,409, the process cartridge as an expendable must have the storage means. Hence, if a process cartridge does not have any storage means, history information indicating whether or not an order has already been placed, a process cartridge for which an order has already been placed, and the like cannot be stored since the process cartridge has no ID or the like, and redundant orders cannot be prevented.

On the other hand, in Japanese Patent Laid-Open No. 11-338323, an image forming apparatus has a history means, which is reset when a new developer unit is attached. In this case, a means for determining if the attached unit is a new one is required, and if such means is not available, redundant orders cannot be prevented.

Also, U.S. Pat. No. 6,233,409, and Japanese Patent Laid-Open No. 11-338323 do not assume any detailed processes on an order placement window in association with order placement, and there is room for improvement in user's usability.

SUMMARY OF THE INVENTION

It is an object of the present invention to provide an image processing apparatus which can prevent redundant orders for various expendables used in the image processing apparatus.

It is another object of the present invention to provide an order placement method that can prevent redundant orders for various expendables used in the image processing apparatus.

It is still another object of the present invention to provide a computer program corresponding to the order placement method, and a storage medium which stores such computer program.

According to one aspect of the present invention, the above object is attained by providing an image processing apparatus which comprises order placement means for executing an operation associated with order placement of an expendable used in an image forming apparatus, comprising: accumulation means for accumulating data associated with image formation to have a timing associated with order placement as a trigger; and order placement control means for controlling the operation of the order placement means on the basis of a value accumulated by the accumulation means.

That is, according to the present invention, in an image processing apparatus which comprises order placement means that executes operations associated with order placement for expendables used in an image forming apparatus, data associated with image formation is accumulated in response to a timing associated with order placement as a trigger, and the operation of the order placement means is controlled on the basis of the accumulated value.

In this manner, since data associated with image formation is accumulated in response to the timing associated with order placement as a trigger, the order placement means can determine with reference to the accumulated value if that timing is appropriate, upon placing an order for an expendable, and redundant orders for expendables can be prevented.

Preferably, the timing associated with order placement is a timing at which a remaining amount of the expendable becomes not more than a predetermined amount, and the apparatus further comprises determination means for determining an accumulation start point of the accumulation means in accordance with information indicating that the remaining amount of the expendable becomes not more than the predetermined amount.

Alternatively, the timing associated with order placement may be a timing at which completion of order placement is recognized, and the apparatus may further comprise determination means for determining an accumulation start point of the accumulation means in accordance with information indicating that completion of order placement is recognized.

The control of the operation of the order placement means may include a process for determining whether order placement is inhibited or permitted.

Preferably, the operation of the order placement means includes a display operation of an order placement window, and the order placement control means controls the display of the order placement window.

In this case, the order placement control means may control to enable/disable order placement window functions depending on whether or not the value accumulated by the accumulation means is not less than a predetermined value.

Preferably, the apparatus further comprises stock count monitor means for monitoring a stock count, and wherein the order placement control means controls launch of order placement on the basis of the stock count monitored by the stock count monitor means, and the value accumulated by the accumulation means.

The image forming apparatus may use a plurality of types of expendables, the accumulation means accumulates the data for respective types of expendables, and the order placement control means controls the operation of the order placement means associated with an expendable of a corresponding type on the basis of each accumulated value.

The data associated with image formation may be a pixel count value or print count.

According to another aspect of the invention, the above object is attained by providing an image processing apparatus which comprises order placement means for executing an operation associated with order placement of an expendable used in an image forming apparatus, comprising: holding means for holding order history information to have a timing associated with order placement as a trigger; and display control means for executing different display control of an order placement window displayed by the order placement means on the basis of the order history information held by the holding means.

According to still another aspect of the present invention, the other object is attained by a method of placing an order for an expendable in an image processing apparatus which comprises order placement means for executing an operation associated with order placement of an expendable used in an image forming apparatus, comprising: the accumulation step of accumulating data associated with image formation to have a timing associated with order placement as a trigger; and the order placement control step of controlling the operation of the order placement means on the basis of a value accumulated in the accumulation step.

According to still further aspect of the present invention, the other object is attained by a method of placing an order for an expendable in an image processing apparatus which comprises order placement step of executing an operation associated with order placement of an expendable used in an image forming apparatus, comprising: the holding step of holding order history information to have a timing associated with order placement as a trigger; and the display control step of executing different display control of an order placement window displayed by the order placement means on the basis of the order history information held in the holding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 15A and 15B show an example of alarm display in the fifth embodiment;

FIGS. 16A and 16B show an example of a setup window used to place an order for expendables in the fifth embodiment;

FIG. 18 shows an example of reference information upon executing an order placement window control process.

DETAILED DESCRIPTION OF THE PREFERRED EMBODIMENTS

Preferred embodiments of the present invention will be described in detail hereinafter with reference to the accompanying drawings.

In embodiments to be described hereinafter, an order placement system for an image forming apparatus that records according to electrophotography as an image processing apparatus will be exemplified. However, the image processing apparatus is not limited to the image forming apparatus, and the present invention can be applied to an image processing apparatus such as a personal computer or the like. Also, the image forming apparatus as the image processing apparatus is not limited to the one according to electrophotography, and the present invention can also be applied to an ink-jet image forming apparatus that uses detachable ink cartridges which store ink, a thermal transfer printer using thermal paper, and the like.

First Embodiment

The overall arrangement of an image forming apparatus of this embodiment will be explained first using FIGS. 1 and 2.

Figure 1:
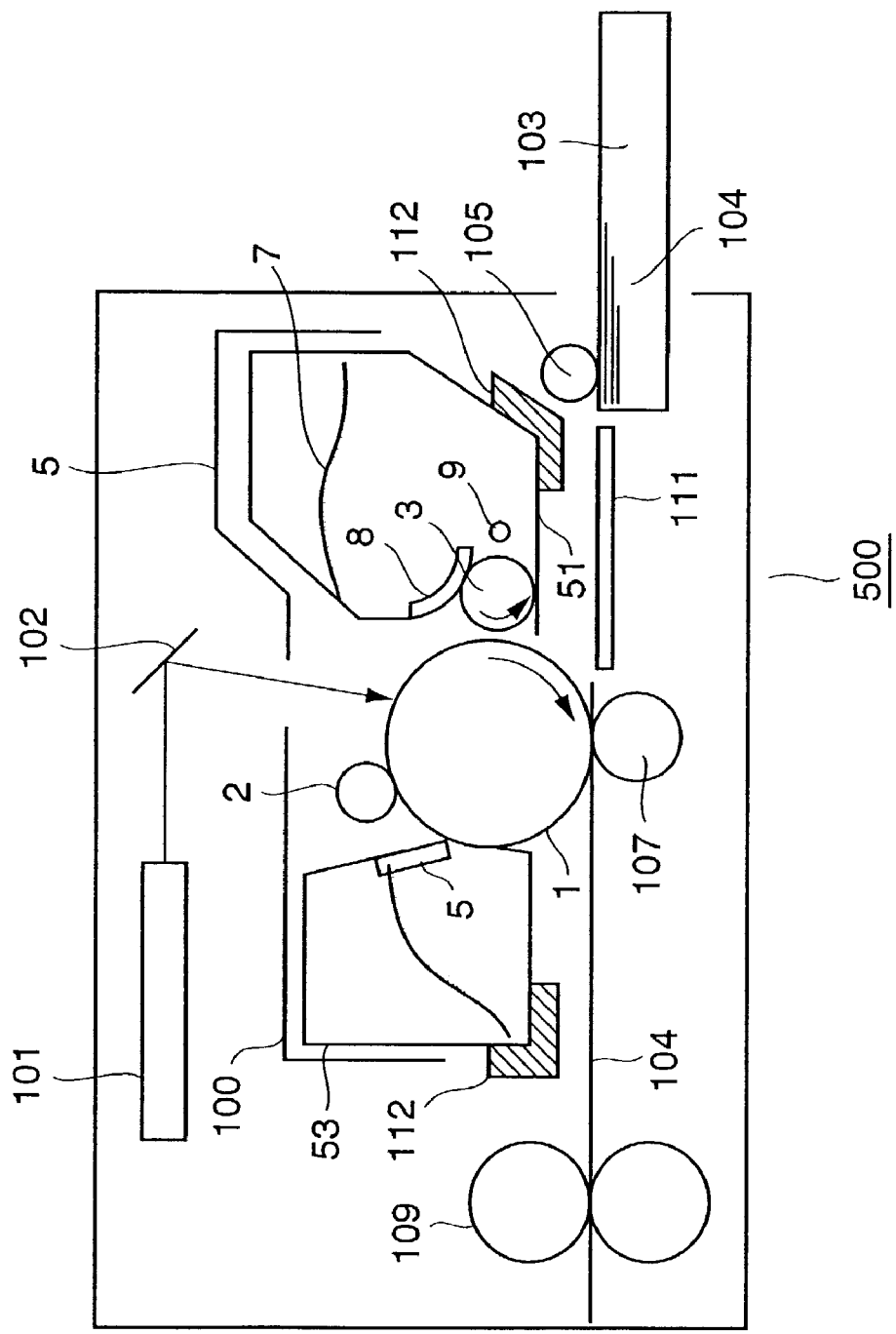
FIG. 1 is a sectional view showing the overall arrangement of an image forming apparatus according to the first embodiment of the present invention.

As shown in the sectional view of FIG. 1, in the image forming apparatus of this embodiment, a scanner unit 101 which includes a laser and polygonal mirror correction system lens outputs a laser beam which has been modulated according to an image signal. This laser beam is reflected by a return mirror 102, and strikes the surface of a photosensitive drum 1 as an electrophotographic photosensitive body. The surface of the photosensitive drum 1 is uniformly charged in advance by a charging roller 2 that serves as a charging means, and an electrostatic latent image is formed on the surface of the drum 1 in accordance with the irradiated laser beam.

On the other hand, toner 7 as a developing agent, which is stored in a toner container 5 as a developing agent storage unit of a developing device 51, is conveyed along the circumferential surface of a developing sleeve 3 while being charged, thus forming a developable toner layer on the developing sleeve 3. The electrostatic latent image is developed by the toner layer and is visualized as a toner image.

A print material 104 as a print medium stored in a cassette 103 is fed by a feed roller 105 simultaneously with formation of the latent image on the photosensitive drum 1. This print material 104 is conveyed to a roller-shaped transfer means 107 via a convey means 111 in synchronism with the leading end of the toner image on the photosensitive drum 1, and the toner image is transferred onto the print material 104 by the transfer means 107. The print material 104 on which the toner image has been transferred is conveyed to a fixing device 109, which fixes the toner image to form a permanent image. The residual toner on the photosensitive drum 1 is removed by a cleaning means 5, and is recovered by a cleaning container 53. Note that the apparatus main body has, at two positions, attachment means 112 that detachably attach a process cartridge 100 in this embodiment.

Figure 2:
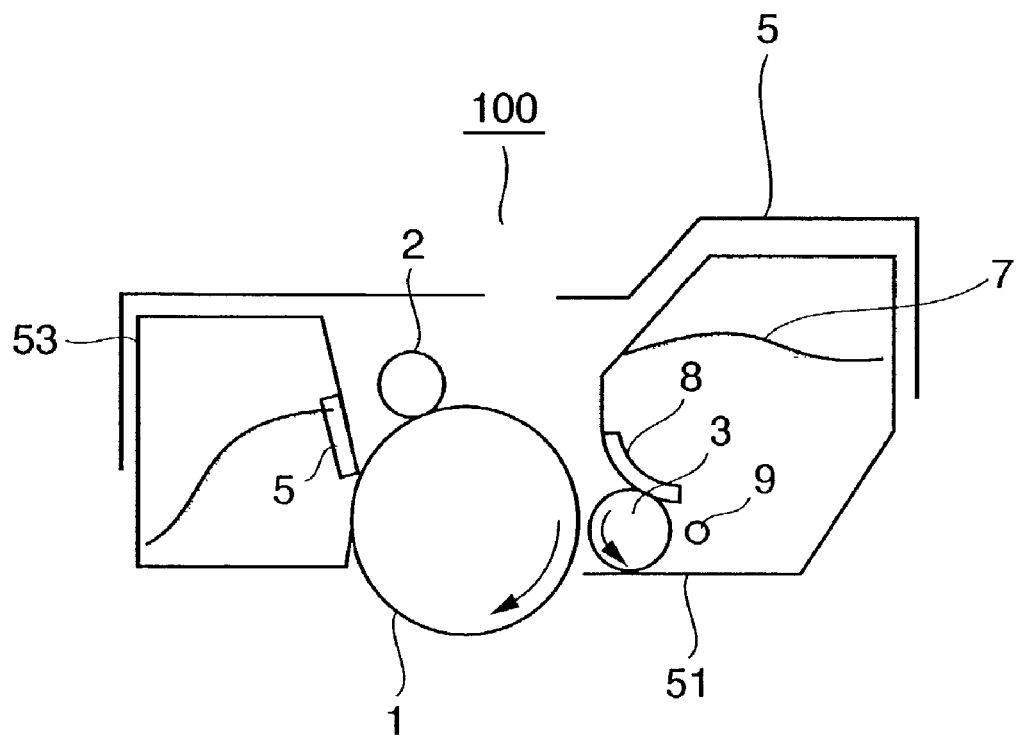
FIG. 2 is a sectional view of a process cartridge of the image forming apparatus shown in FIG. 1.

The process cartridge 100 shown in FIG. 2 integrates the photosensitive drum 1, the charging roller 2, the developing device 51, the cleaning means 5 comprising an elastic cleaning blade, the cleaning container 53, and a cover 52 which partially covers them so as to form at least two units.

These components such as the photosensitive drum 1 and the like are assembled in the process cartridge 100 to have a predetermined layout relationship, and the process cartridge 100 is inserted and attached to predetermined portions (attachment means 112) in the image forming apparatus main body and is detached from the apparatus main body by a predetermined method.

Note that the developing device 51 has a developing blade 8 that regulates the thickness of the toner layer on the developing sleeve 3, and a detection member 9 for detecting the remaining amount of toner in the toner container 5, and a magnet (not shown) is fixed to the interior of the developing sleeve 3.

Assume that the image forming apparatus of the present invention comprises a remaining amount detection means based on a change in capacitance of toner as a means for detecting that the remaining amount of toner in the developing device runs short after repetition of the aforementioned image forming operation, and respective processes to be described later are executed on the basis of recognition of information used to derive the remaining amount detected by the remaining amount detection means by the image forming apparatus.

Figure 3:
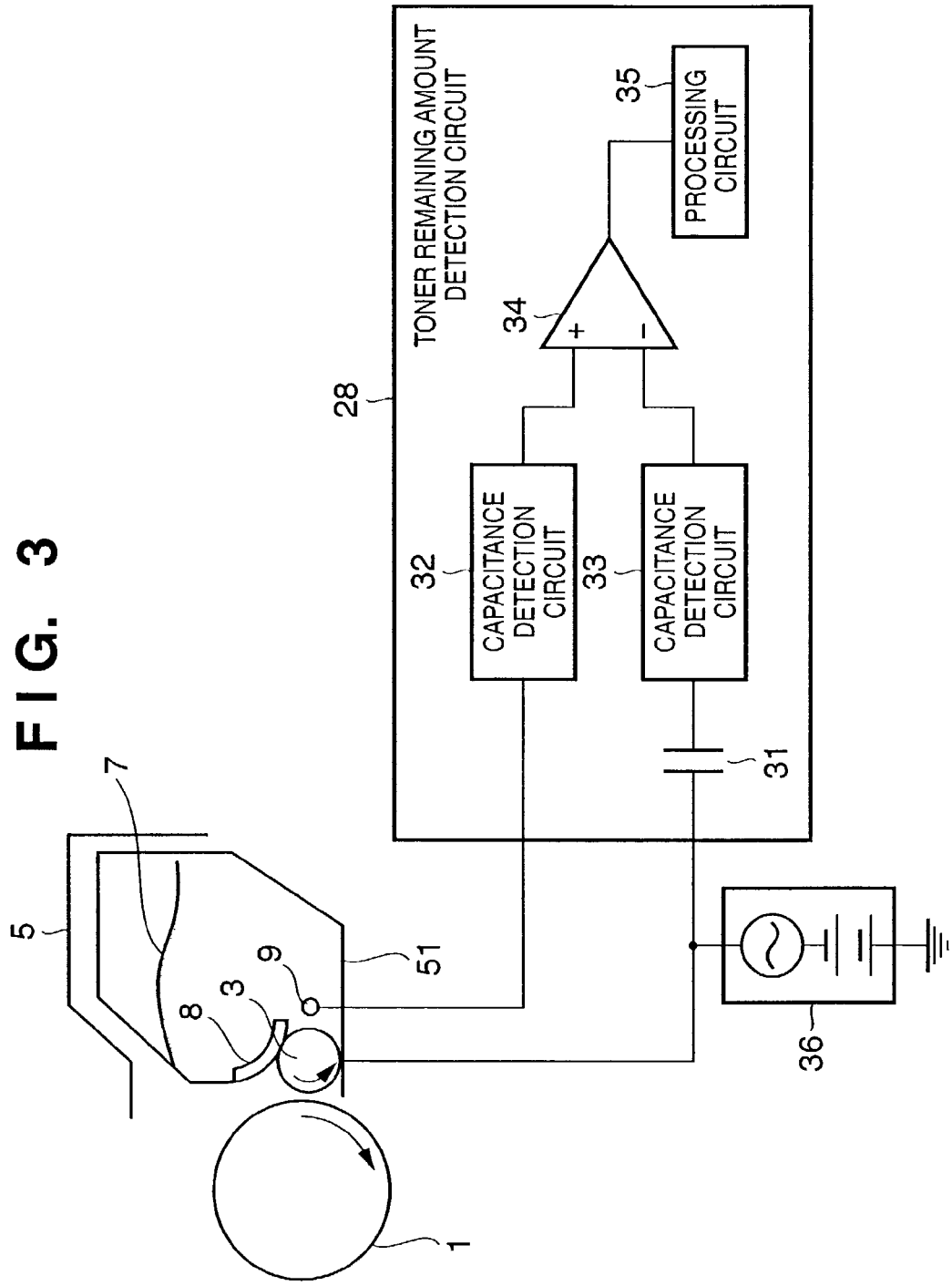
FIG. 3 is a block diagram showing the arrangement of a remaining amount detection means of the first embodiment.

FIG. 3 shows the arrangement of the remaining amount detection means. In this embodiment, a metal antenna rod 9 serving as a toner remaining detection electrode is arranged near the developing sleeve 3. A power supply 36 applies an AC voltage across this antenna rod 9 and the developing sleeve 3. The image forming apparatus main body has a toner remaining amount detection circuit 28, and a comparator 34 compares the capacitance between the antenna rod 9 and developing sleeve 3, which is detected by a capacitance detection circuit 32 in that detection circuit 28 with that of a comparison capacitor 31 detected by a capacitance detection circuit 33. When the difference between the two capacitances compared by the comparator 34 is negative, it is determined that the toner remaining amount has become equal to or smaller than a predetermined value, and a processing circuit 35 executes a predetermined process. For example, an alarm "toner Low" or the like may be displayed on the image forming apparatus main body or the screen of a personal computer connected to the image forming apparatus main body. By adjusting the capacitance of the comparison capacitor 31, the toner remaining amount to be detected can be arbitrarily set.

Note that the remaining amount detection method includes a method of detecting the level of toner in a toner container by receiving light emitted by an LED or the like by a light-receiving sensor via the toner, a detection method based on a change in torque of a toner stirring means, and the like. Although the effect of the present invention can be obtained independently of the detection method used, this embodiment uses the aforementioned remaining amount detection means based on a change in capacitance.

In this embodiment, the device itself for detecting various remaining amounts has been explained as the remaining amount detection means. However, in practice, the remaining amount is recognized when the image forming apparatus (CPU) recognizes a signal obtained by the device for detecting the remaining amount, and respective processes are executed based on the recognized remaining amount. Hence, the remaining amount detection means may be considered as means (CPU) for recognizing the remaining amount in the image forming apparatus. That is, this embodiment considers the remaining amount detection means as the remaining amount recognition means in the image forming apparatus.

An order placement system of this embodiment will be explained below.

Figure 4:
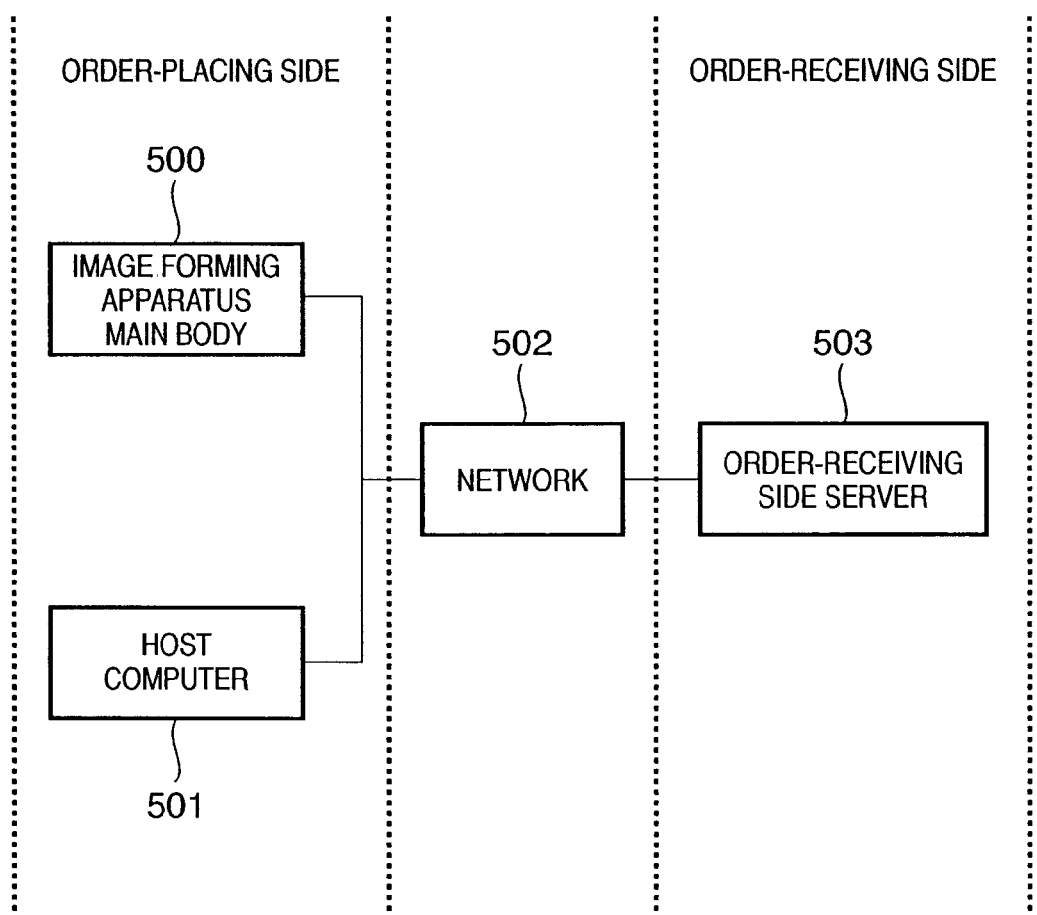
FIG. 4 is a schematic diagram showing network connections between the order-placing side and the order-receiving side of an order placement system.

FIG. 4 is a block diagram showing information exchange between the order-placing side and the order-receiving side. As shown in FIG. 4, an order-placing side system comprises at least an image forming apparatus 500 and host computer 501, which are connected to a network 502, and an order-receiving side system comprises an order-receiving side server 503 used to load information. Both these order-placing side system and order-receiving side system are connected to the network 502 via an Internet protocol. The network 502 is a wide-area network formed using various lines.

After the aforementioned remaining amount detection, a CPU in the image forming apparatus main body 500 sends information such as the home page address of the manufacturer, retailer, service center, or the like as the selling agency of that image forming apparatus, or expendable order placement dedicated home page address, and the model number of that image forming apparatus or the model number of the toner container, process cartridge, or the like to the host computer 501 connected to the image forming apparatus main body 500. The user or administrator of that image forming apparatus accesses the order-receiving side server 503 using that home page address, inputs predetermined user information such as the user name, address, telephone number, and the like from an order placement window, and then places an order. Upon completion of order placement, the order-receiving side server sends order placement complete information.

As the arrangement of another order placement system, a communication means of the image forming apparatus main body 500 can establish connection to the network 502, and the image forming apparatus main body is assigned an IP address. With such arrangement, the user or administrator can input the presence/absence of necessity of an order for a toner container or process cartridge on the screen of the host computer 501 connected to the image forming apparatus main body 500. When the user or administrator determines that an order for a toner container or process cartridge is necessary, the image forming apparatus main body 500, which receives that information from the host computer 501, directly communicates with the order-receiving side server 503 of the manufacturer, retailer, service center, or the like as the selling agency of the image forming apparatus, thus automatically placing an order by inputting user information including the model number of the toner container or process cartridge, order source, its address, and the like.

The manufacturer, retailer, or service center as the selling agency that received the user information sends order placement complete information to the image forming apparatus main body 500 assigned with the IP address as soon as the placed order is registered. Upon receiving the information, the image forming apparatus main body 500 transfers the order placement complete information to the host computer 501 to which the apparatus main body 500 is connected.

Alternatively, user information such as the user name, address, telephone number, and the like of the order source is registered in a storage means of the image forming apparatus main body 500 assigned with the IP address, and the image forming apparatus main body 500 establishes connection to the order-receiving side server 503 such as the manufacturer, retailer, service center, or the like as the selling agency of the image forming apparatus and automatically inputs the user information to place an order simultaneously with launch of the order placement system. In such case, the apparatus main body 500 may inform the user or administrator of only order placement complete information.

Note that "launch of the order placement system" indicates a process that pertains to order placement, for example, access to a specific address of the order-receiving side server by a communication means of the image forming apparatus or host computer connected to the image forming apparatus via the network, a display instruction of an order placement window or display of a message that prompts the user to display the order placement window, display of an alarm to suppress an order, or the like.

A method of preventing redundant orders by the second and subsequent remaining amount detection processes for a single cartridge in this embodiment will be described below.

In this embodiment, the number of printed dots is accumulated (pixel count) to have a cancel timing of remaining amount detection as a start point, and whether or not the order placement system is launched is determined in accordance with the remaining amount detection and its accumulated value.

Figure 5A:
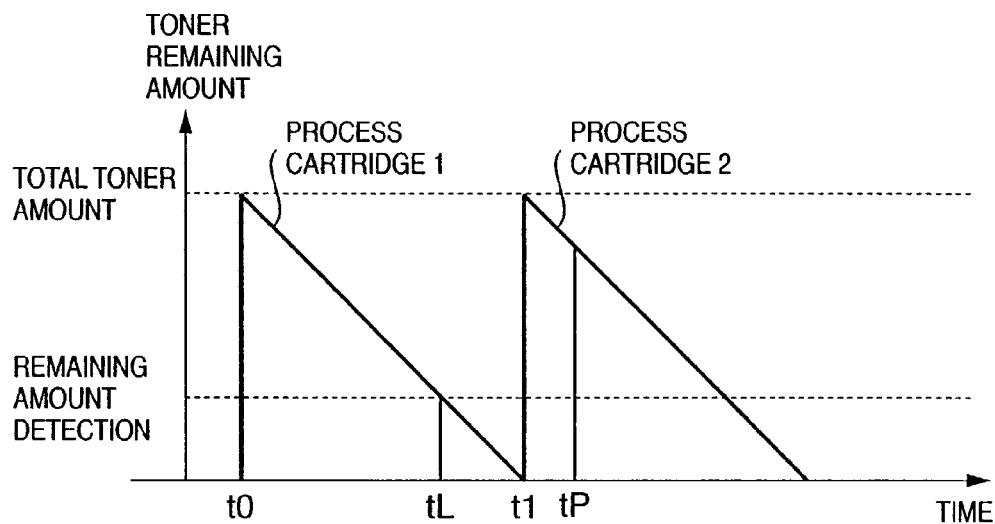
FIGS. 5A and 5B are graphs for explaining a method of inhibiting the order placement system from being launched in the first embodiment.
Figure 5B:
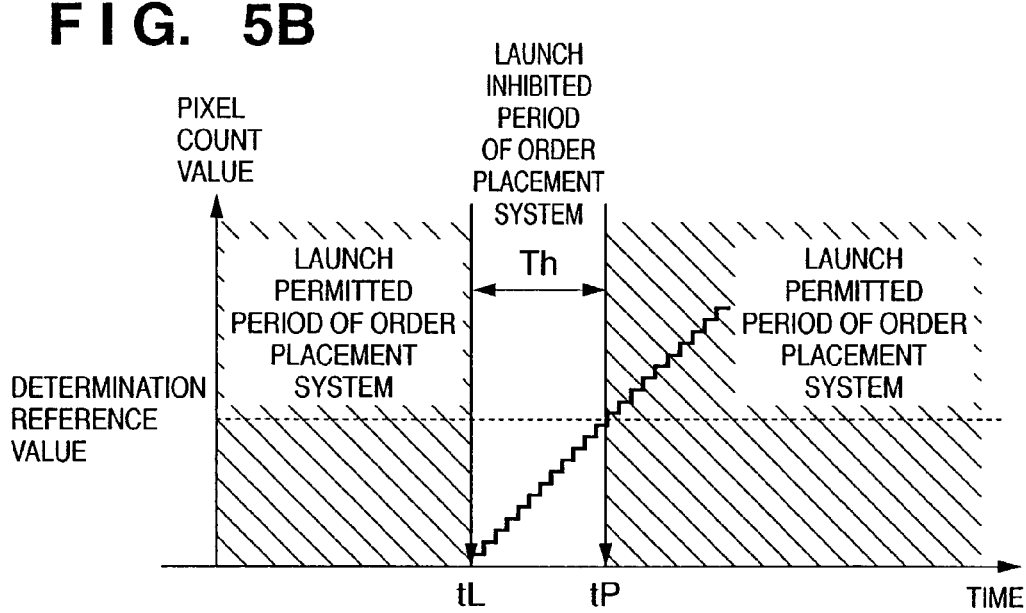

This feature will be explained in detail below using FIGS. 5A and 5B. FIG. 5A shows a change in remaining amount of toner in a process cartridge, and shows a case wherein an old process cartridge is replaced by a new one when the toner remaining amount has become zero. FIG. 5B shows a pixel count value, which begins to be counted at the operation start timing of remaining amount detection with respect to the toner remaining amount shown in FIG. 5A. The abscissa in FIGS. 5A and 5B plots time, the ordinate in FIG. 5A plots the toner remaining amount, and that in FIG. 5B plots the count value.

In this embodiment, the pixel count value is used as a reference upon determining whether or not the order placement system is launched, and the order placement system is allowed to be launched after timing tP at which the pixel count value has reached a value when toner in the developing device has been consumed about 50%. That is, the order placement system is inhibited from being launched during a period Th from timing tL of remaining amount detection until timing tP at which the pixel count value has reached a value when toner in the developing device has been consumed about 50%.

In general, remaining amount detection is programmed to work when toner in the developing device has been consumed 70 to 90% of the total capacity. In this embodiment, detection is made when toner has been consumed by an amount corresponding to 70% of the total capacity.

In FIG. 5A, t0 indicates the first use timing of the image forming apparatus, and process cartridge 1 is attached to the image forming apparatus at this time. The toner remaining amount of process cartridge 1 decreases as printouts are formed, and when the remaining amount detection works at timing tL, the order placement system is launched to execute an order placement procedure of an expendable. In addition, the language of "expendable" in this case of the embodiment and other cases of the embodiment can be transposed to the language of "consumable".

The user detaches process cartridge 1 from the image forming apparatus main body after tL, shakes it to the right and left, attaches the cartridge again to temporarily cancel a remaining amount alarm, and uses that cartridge again. As shown in FIG. 5B, a pixel count process starts from a count value 0 at timing tL, and the order placement system is inhibited from being launched until the count value reaches a value when the toner is consumed 50% of the total capacity. Therefore, even when the old process cartridge is used and the remaining amount detection works again, redundant orders of an expendable can be prevented being placed since the order placement system is inhibited from being launched.

After process cartridge 1 is attached again and is continuously used, the toner remaining amount runs short, and dot omissions occur frequently. Hence, the user replaces process cartridge 1 by new process cartridge 2 at timing t1. After that, the user forms printouts using process cartridge 2. When the toner remaining amount of process cartridge 2 runs short and the remaining amount detection works, the image forming apparatus recognizes that pixel count value shown in FIG. 5B has already exceeded a determination reference value, and also that the order placement system launch inhibition period Th has been exceeded. Hence, the order placement system is launched to execute an order placement procedure.

In this manner, this embodiment uses a pixel count value corresponding to the number of printed dots as a value used to estimate the amount of consumed toner. Of course, the present invention is not limited to the pixel count value itself, and the toner amount may be estimated using a value based on the pixel count value, which is obtained by correcting the pixel count value by predetermined arithmetic operations.

Figure 6:
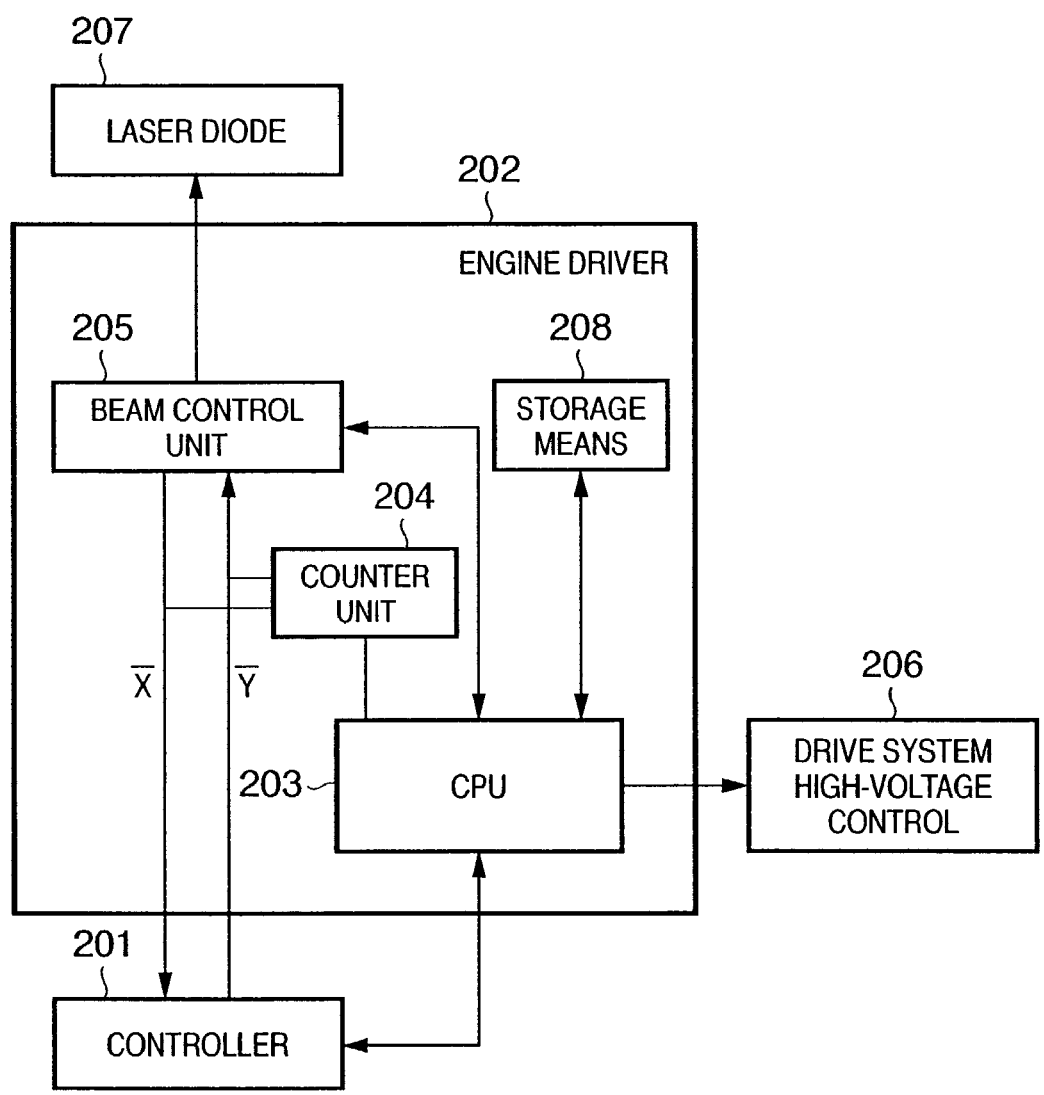
FIG. 6 is a block diagram showing the control arrangement of the image forming apparatus of the first embodiment.

FIG. 6 is a block diagram showing the control arrangement of the image forming apparatus of this embodiment. In FIG. 6, a controller 201 in the image forming apparatus main body has a function of converting print data sent from a host computer (not shown) into a printable signal. An engine driver 202 has a function of controlling a paper feed & image forming sequence, or detecting machine status such as an error or the like.

The controller 201 is connected to a CPU 203 in the engine driver 202, and sends an image signal and image control signal to a beam control unit 205. The CPU 203 sends a control signal to a drive system high-voltage control circuit 206 which controls a driving motor for rotating the photosensitive drum and the like and charging and developing biases.

Figure 7:
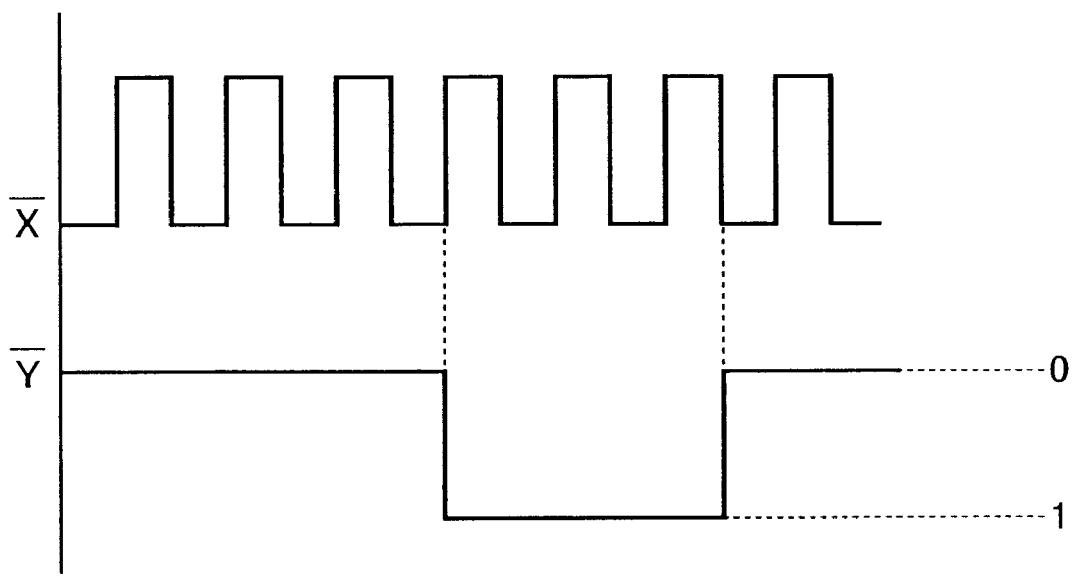
FIG. 7 is a chart showing an example of signals associated with a pixel count process.

The pixel count process will be described in more detail below with reference to FIG. 7. A reference signal X is output from the beam control unit 205 upon writing an image signal. An image signal Y is output form the controller 201 in synchronism with this reference signal X. Assume that a black pattern on an image is 1 in the image signal Y, and a white pattern is 0. If the image signal Y is 1, a laser diode 207 is turned on in synchronism with the reference signal X. Hence, the count value of the reference signals X while the image signal Y is 1 is equal to the number of dots of a beam signal emitted by the laser diode 207. A count unit 204 counts the reference signals X while the image signal Y is 1.

The pixel count value obtained in this manner is stored and accumulated in a storage means 208 by the CPU 203. The storage means is a nonvolatile storage means, and can use, e.g., an electrical storage means such as a RAM, programmable ROM, or the like as long as they can rewritably store and hold signal information.

Although not shown in FIG. 6, the CPU 203 also has a function of storing the pixel count value counted by the count unit 204 in a nonvolatile storage means provided to an expendable cartridge which stores an expendable such as toner, ink, or the like, and is detachable from the image forming apparatus main body. In the present invention, the storage process of predetermined information in the storage means 208 in this embodiment may be replaced by a process for storing such information in the nonvolatile storage means provided to the expendable cartridge.

With the above arrangement, verification is made using a process cartridge that stores toner in amount corresponding to 6000 A4 sheets at a print ratio of 5%, and LBP-450 (a printer product available from Canon Inc.) as an image forming apparatus having a recording density of 600 dpi. The following processes correspond to those of the image forming apparatus.

The remaining amount detection is set to work when the toner remaining amount reaches 20% of the initial toner amount. That is, the remaining amount detection works when printouts corresponding to 4800 sheets are formed if a print process is made at a print ratio of 5%. That is, the image forming apparatus recognizes that the remaining amount runs short.

When the remaining amount detection is canceled (when the user shakes the cartridge after the image forming apparatus temporarily recognizes that the remaining amount has become equal to or smaller than a predetermined amount, the remaining amount is then detected to be larger than the predetermined amount), the pixel count process is launched, and the control is made to inhibit the order placement system from being launched, since it is determined that the process cartridge is not replaced by a new one until a reference value that uses a pixel count accumulated value (6,960,416,000 pixels) corresponding to 4000 A4 sheets at a print ratio of 5% is exceeded in the next remaining amount detection.

Initially, when the process cartridge was attached to the image forming apparatus (LBP-450) and printouts were continuously formed at a print ratio of about 5%, the remaining amount detection worked at the time of output of the 4950th sheet, the order placement system was launched, and the image forming apparatus executed an order placement process.

The user detached the process cartridge that had undergone remaining amount detection from the image forming apparatus main body, shook it to the right and left five or six times by hands, and attached the cartridge to the image forming apparatus main body again. With this operation, an alarm displayed by the remaining amount detection was temporarily canceled. The pixel count process started from that timing.

Furthermore, when printouts were continuously formed at a print ratio of about 5%, the remaining amount detection worked after 535 sheets were output (a total of 5485 sheets). Since the pixel count value at that time was 930,955,640 pixels, and was smaller than the reference value, the order placement system was not launched.

Again, when the user detached that process cartridge from the image forming apparatus main body, shook it to the right and left, and tried to form continuous printouts, the remaining amount detection worked after another 210 sheets (a total of 5695 sheets). Since the pixel count value at that time was 365,421,840 pixels, and was smaller than the reference value, the order placement system was not launched.

After that, since dot omissions occurred frequently during the print process, and the above process cartridge could no longer be used, it was replaced by a new process cartridge, and printouts were continuously formed at a print ratio of about 5%. In this case, the remaining amount detection worked at the time of output of the 5025th sheet. Since the pixel count value at that time was 8,744,022,600 pixels, and was larger than the reference value, the order placement system was launched.

In this manner, the order placement system can be controlled to be launched once per process cartridge, and redundant orders can be prevented.

As described above, according to this embodiment, the pixel count process starts to have the cancel timing of remaining amount detection as a start point, and whether or not the order placement system is launched is determined by comparing the value based on that pixel count process with the reference value. Hence, the order placement system can be controlled to be launched only once during use of one expendable, and redundant orders for expendables can be prevented.

In the above description, after the image forming apparatus temporarily recognizes that the toner remaining amount has become equal to or smaller than the predetermined amount, and an alarm indicating that the remaining amount has become equal to or smaller than the predetermined amount is canceled when the user shakes the process cartridge, the image forming apparatus starts the pixel count process. As another aspect, the control may be made to start the pixel count process to have, as a trigger, a timing at which the remaining amount of toner stored in the process cartridge has become equal to or smaller than the predetermined amount for the first time. In this manner, redundant orders can be prevented without shaking the process cartridge purposely by the user.

Second Embodiment

The second embodiment of an order placement system of an image processing apparatus according to the present invention will be described below. In the following description, features of this embodiment will be mainly explained, and a description of the same parts as in the first embodiment will be omitted.

In this embodiment, the pixel count process is executed, and whether or not the order placement system is launched is determined by comparing the pixel count value with the reference value as in the first embodiment. However, unlike in the first embodiment, the pixel count process starts when order placement for an expendable by the order placement system is complete.

This is for the following reason. That is, the order placement system is launched when the remaining amount detection works for the first time. However, when the user forgets to place an order for an expendable at that time or elects not to do so, the order placement system must be launched when the remaining amount detection works again upon reusing the identical expendable.

The toner remaining amount detection means, the pixel count means, and the reference value used upon determining the presence/absence of necessity of launch of the order placement system are the same as those in the first embodiment.

The order placement system is launched from either the image forming apparatus main body or host computer, and executes an order placement procedure with the order-receiving side server via the network.

When the image forming apparatus has an IP address and places an order via communications with the order-receiving side server, the pixel count value is reset to zero when the image forming apparatus main body receives order placement complete information. On the other hand, when the host computer places an order via communications with the order-receiving side server, the host computer that receives order placement complete information automatically transfers that information to the image forming apparatus main body, and the image forming apparatus that receives the information resets the pixel count value to zero.

Figure 8:
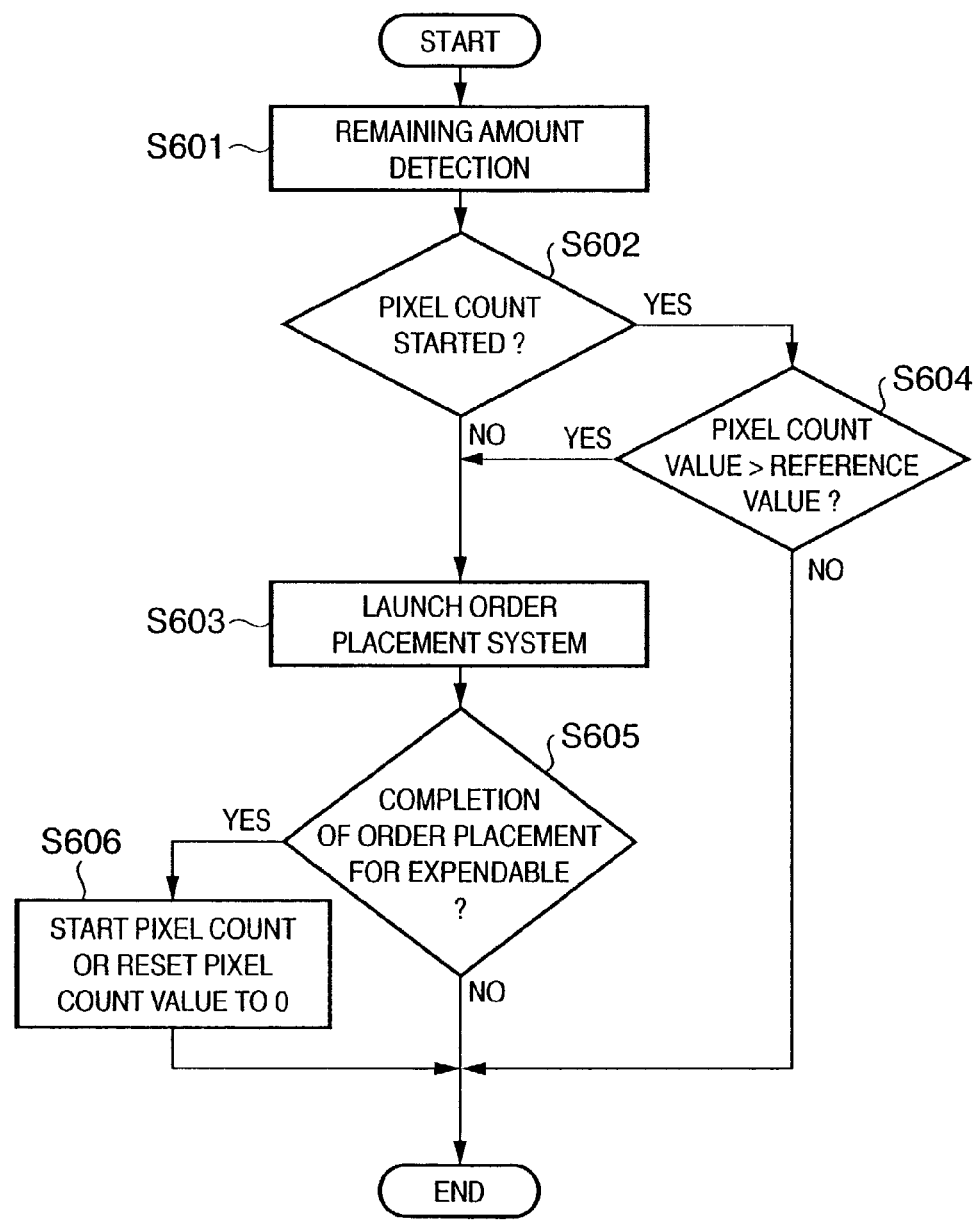
FIG. 8 is a flow chart showing the operation associated with remaining amount detection according to the second embodiment.

The process associated with remaining amount detection of this embodiment will be described below with reference to the flow chart shown in FIG. 8. Note that processes in respective steps in the flow chart shown in FIG. 8 are implemented when a CPU provided to the image forming apparatus loads a program stored in a nonvolatile storage means, and executes processes based on the loaded program code.

If the remaining amount detection works in a process cartridge which is in use (step S601), the CPU checks if the count value is zero to see if a pixel count process has been started (step S602). If the image forming apparatus main body is used for the first time, and the pixel count process has not been started yet, the CPU launches the order placement system (step S603).

On the other hand, if the count process has been started, the CPU checks if the pixel count value has exceeded the reference value. If the pixel count value has not exceeded the reference value yet, the CPU ends the process. If the pixel count value has exceeded the reference value, the CPU determines that the toner remaining amount in the process cartridge in use runs short, and launches the order placement system (step S603).

If the order placement system is launched, the CPU checks if order placement for an expendable is complete (step S605). If order placement is complete, the CPU starts the pixel count process or resets the pixel count value to zero (step S607).

On the other hand, if no order for an expendable is placed, the pixel count value is maintained, and is accumulated. Hence, in the next remaining amount detection in that expendable, since the pixel count value is larger than the reference value, the order placement system is launched.

On the other hand, if the CPU determines in step S604 that the pixel count value has not exceeded the reference value yet, the pixel count value is maintained, and the order placement system is inhibited from being launched. That is, even when remaining amount detection works until the toner of that expendable comes to end of its service life after completion of order placement for an expendable, since the pixel count value is smaller than the reference value, the order placement system is inhibited from being launched.

As described above, according to this embodiment, since the completion timing of order placement for an expendable is used as the start point of the pixel count process, even when the user does not place an order for an expendable by the order placement system or forgets to do so, the order placement system can be launched again at the next remaining amount detection timing. On the other hand, when order placement is complete, the order placement system is inhibited from being launched during use of the old expendable. Hence, the order placement system can be launched as needed.

Third Embodiment

The third embodiment of an order placement system of an image processing apparatus according to the present invention will be described below. In the following description, features of this embodiment will be mainly explained, and a description of the same parts as in the first and second embodiments will be omitted.

In this embodiment, the toner container, developing device, or process cartridge comprises a history means that keeps a record when the order placement system is launched, and the presence/absence of necessity of launch of the order placement system is determined by checking the state of the history means.

In this embodiment, the process cartridge includes a simple electrical circuit as the history means, and when the order placement system is launched, that electrical circuit is short-circuited to make the process cartridge recognize that the order placement system is launched, thus preventing the order placement system from being launched repetitively.

Figure 9:
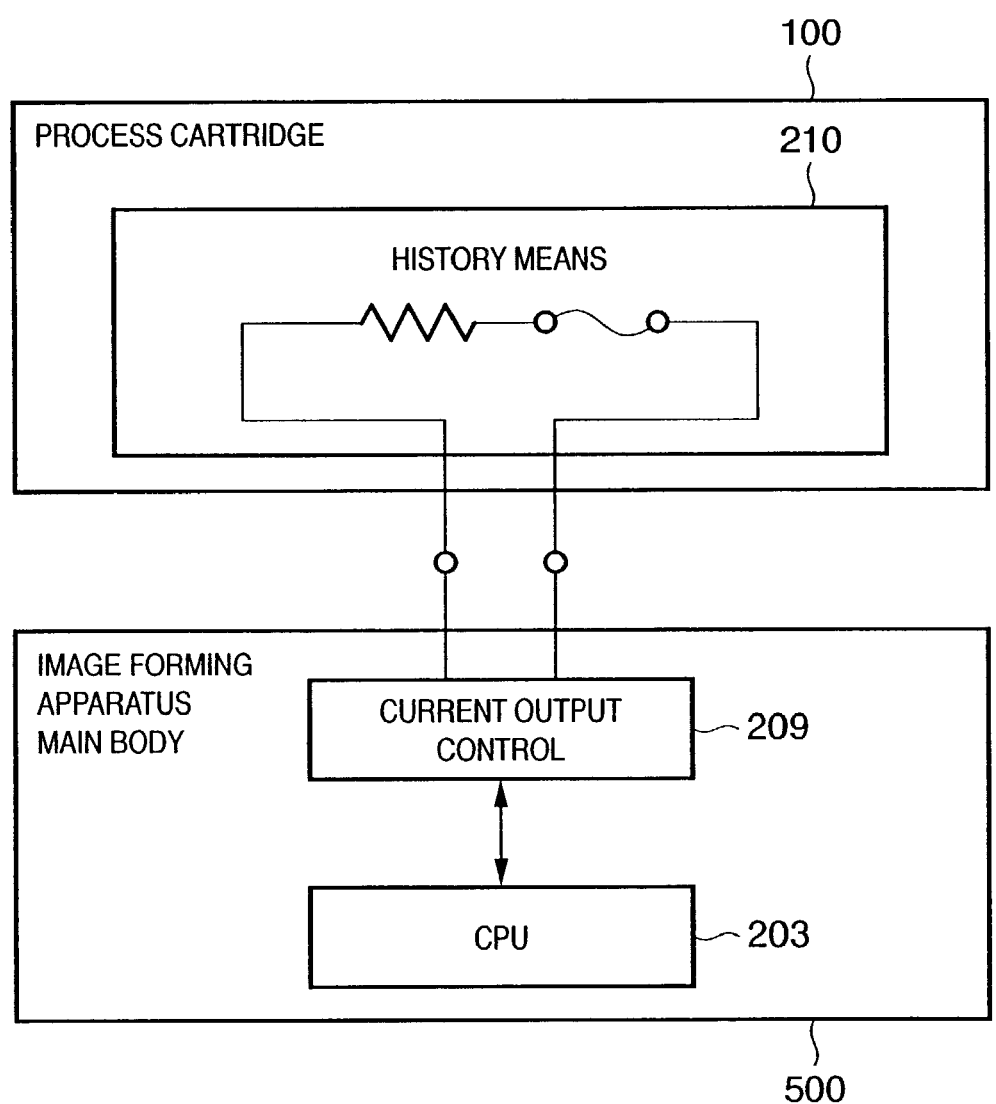
FIG. 9 is a block diagram showing a history means and the control arrangement for the history means according to the third embodiment.

FIG. 9 is a block diagram showing the history means of this embodiment, and the control arrangement for the history means. On the cleaning container side in the process cartridge 100, a circuit (C circuit) which is formed by a combination of a resistor and fuse and serves as a history means 210, and contacts are provided. When a process cartridge is attached to the image forming apparatus main body 500, these contacts are brought into contact with those of the main body side, and a current output control circuit 209 of the main body can supply a current of a predetermined value to the C circuit 210. The CPU 203 changes the current output value as needed to check the energization state of the C circuit.

Figure 10:
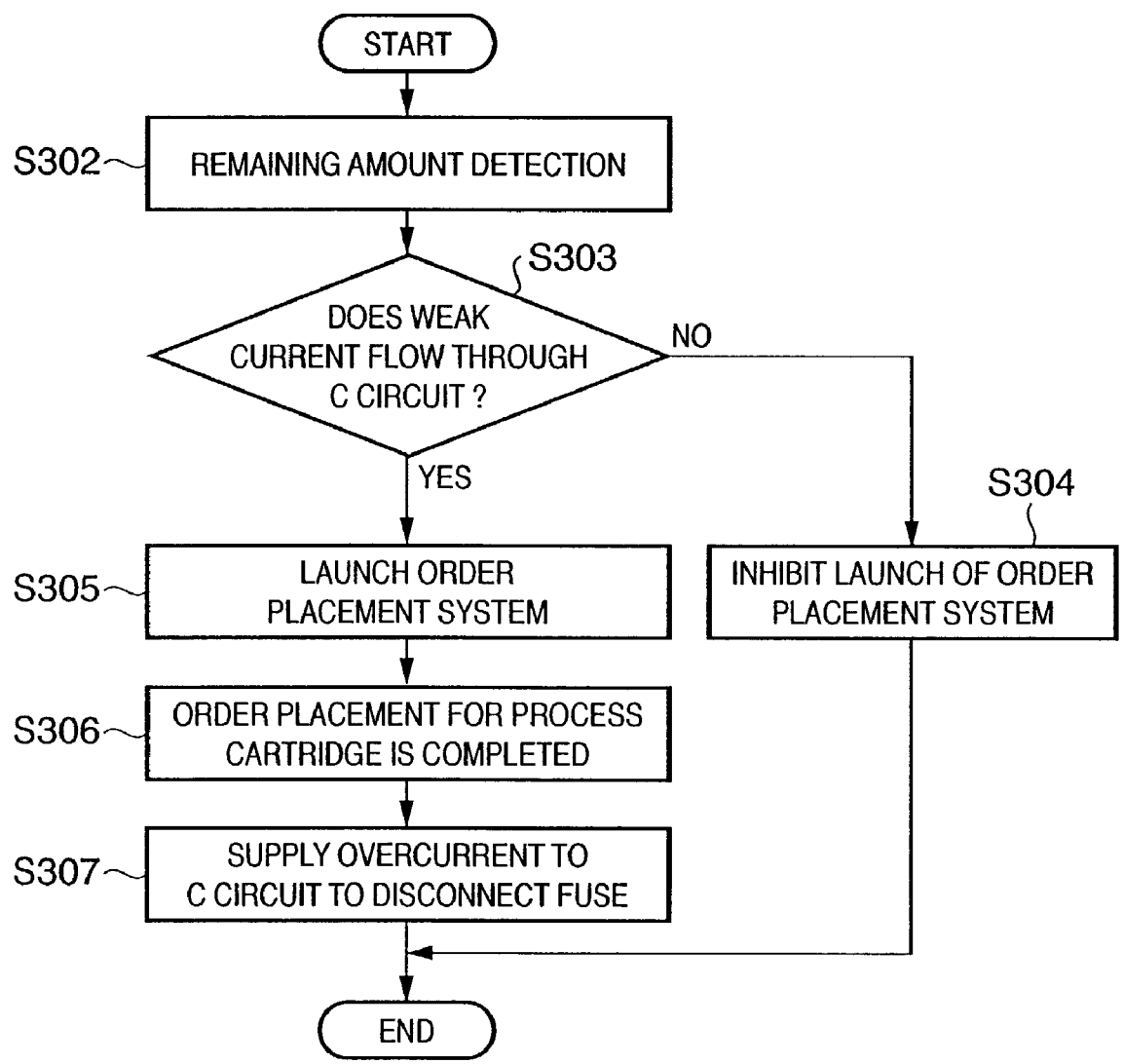
FIG. 10 is a flow chart showing the operation associated with remaining amount detection according to the third embodiment.

The process associated with remaining amount detection of this embodiment will be described below with reference to the flow chart in FIG. 10. Note that processes in respective steps in the flow chart shown in FIG. 8 are implemented when a CPU provided to the image forming apparatus loads a program stored in a nonvolatile storage means, and executes processes based on the loaded program code.

If remaining amount detection works in a process cartridge which is in use (step S302), the CPU controls the current output control circuit to supply a current, which is weak enough not to disconnect to the fuse, to the electrical circuit (C circuit 210) provided to the process cartridge, and checks the energization state (step S303). If the weak current flows through the C circuit, the CPU determines that the remaining amount detection works for the first time, and launches the order placement system (step S305). Note that launch of the order placement system is the same as the first embodiment.

If the image forming apparatus main body detects upon receiving order placement complete information that the order place system has placed an order for a developer or process cartridge to the selling agency (step S306), the CPU controls the current output control circuit to supply a current, which is high enough to surely disconnect the fuse, to the C circuit of the process cartridge, so as to disconnect the fuse (step S307).

After that, when the user detaches the process cartridge from the image forming apparatus main body, shakes it to the right and left to even out the remaining toner, and attaches the cartridge to the image forming apparatus main body again, an alarm of remaining amount detection is canceled.

If the user continues the print processes in this state, the remaining amount detection works again (step S302). In this case, if the CPU supplies a current, which is weak enough not to disconnect the fuse, to the C circuit to check the energization state in the same manner as the previous process (step S303), since the fuse has been disconnected by the previous remaining amount detection, no weak current flows. Hence, the CPU of the image forming apparatus main body detects this state, and inhibits the order placement system from being launched (step S304). In this manner, redundant orders for a developer or process cartridge can be avoided.

Since the overcurrent used to disconnect the fuse is supplied immediately after order placement for a process cartridge is completed, when the order placement system is launched in response to the first remaining amount detection, but the user neither places an order nor completes order placement, supply of an overcurrent to the fuse to disconnect it can be prevented. Hence, the order placement system is launched again in response to the next remaining amount detection, and prompts the user to place an order for a developer or process cartridge.

As described above, according to this embodiment, since the toner container, developing device, or process cartridge comprises the history means that keeps a record of launch of the order placement system, whether or not an order has been placed actually can be confirmed. Hence, the user can be prevented from placing redundant orders.

Fourth Embodiment

The fourth embodiment of an order placement system of an image processing apparatus according to the present invention will be described below. In the following description, features of this embodiment will be mainly explained, and a description of the same parts as in the first to third embodiments will be omitted.

In this embodiment, a developer or process cartridge comprises an individual identification detection means, and an order history is stored in each identified cartridge, so as to allow a newly attached developer or process cartridge to place an order only once.

As an individual identification method, a method of attaching identification information such as a barcode or the like to a developer or process cartridge, irradiating the attached information with light, and reading the identification information by a detector based on reflected light so as to identify an individual developer or process cartridge, a method of attaching a plurality of actuation segments to a developer or process cartridge to push microswitches equipped in the image forming apparatus main body, so as to identify an individual developer or process cartridge, a method of providing an electrical circuit to a developer or process cartridge, and identifying each individual developer or process cartridge based on the resistance on the circuit, a method of identifying each individual process cartridge based on an ID stored in a nonvolatile storage means provided to the cartridge, and the like are available.

This embodiment will exemplify a case wherein a barcode sticker serving as identification information is attached to a process cartridge, and the image forming apparatus main body reads that barcode to identify each individual cartridge.

Figure 11:
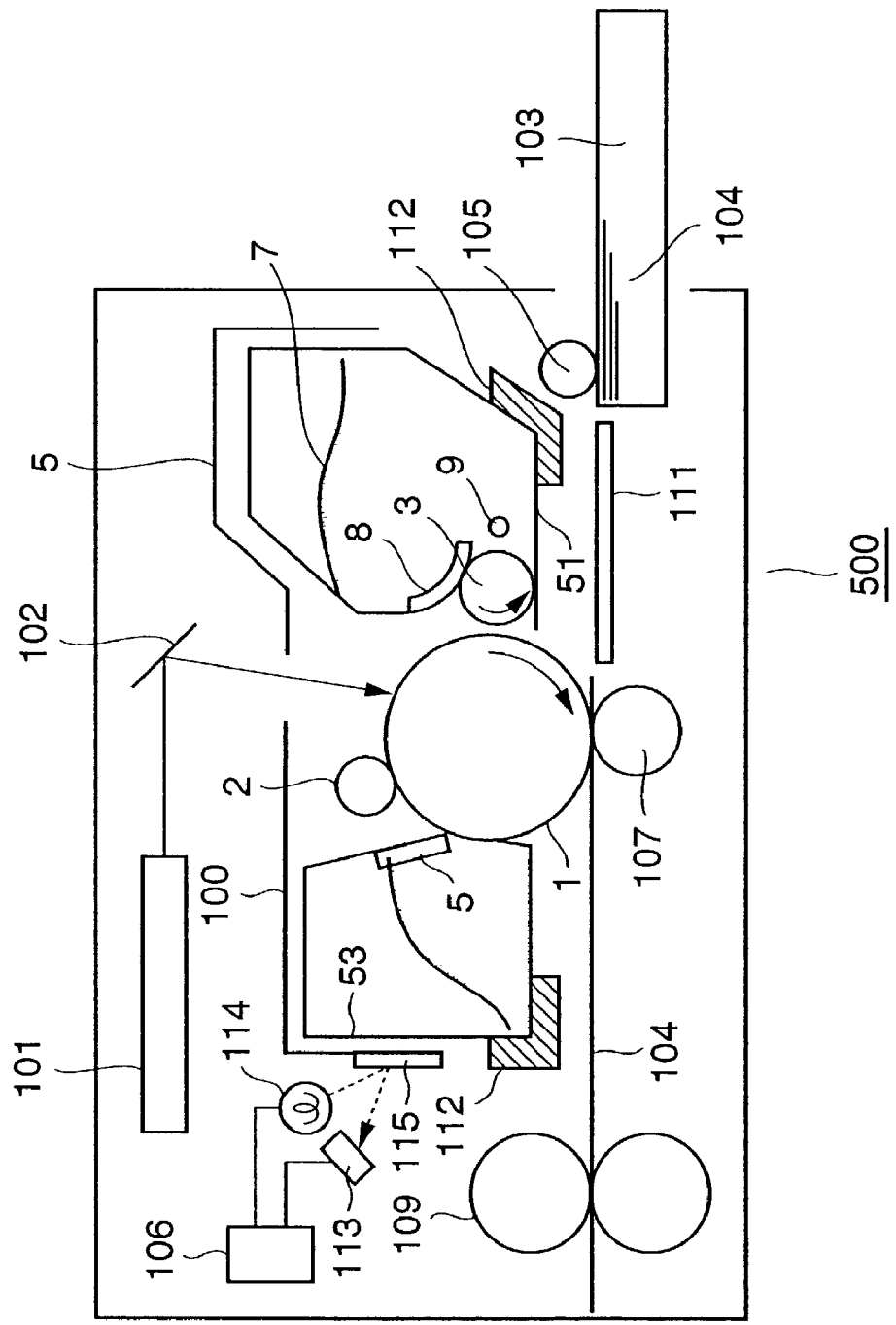
FIG. 11 is a sectional view showing the overall arrangement of an image forming apparatus according to the fourth embodiment.

FIG. 11 is a sectional view showing the overall arrangement of the image forming apparatus of this embodiment. In this embodiment, a barcode sticker 115 is affixed to a portion on the distal end side of the cleaning container 53 of the process cartridge 100. After the process cartridge 100 is attached to the image forming apparatus main body, the barcode sticker is irradiated with light emitted by a detection light source 114 which is equipped in the image forming apparatus main body and comprises an LED or the like, light reflected by the sticker is read by a detector 113 which comprises, e.g., a photodiode, and a control means 116 identifies each individual process cartridge 100.

The sequence of the individual identification process will be explained below with reference to the block diagram of FIG. 12 that shows the control arrangement of this embodiment.

Figure 12:
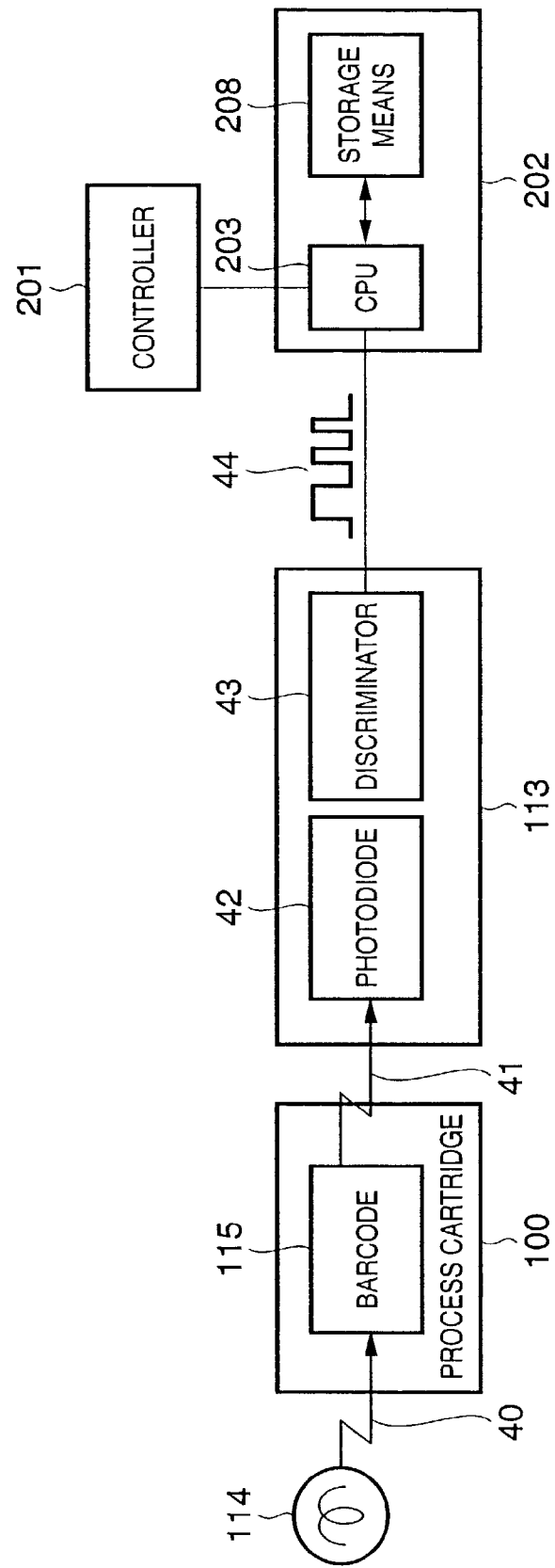
FIG. 12 is a block diagram showing the arrangement associated with a read process of individual identification information.

Referring to FIG. 12, the barcode 115 on the process cartridge 100 is irradiated with detection light 40 emitted by the detection light source 114, and light 41 reflected by the barcode enters the detector 113. The reflected light that has entered the detector 113 is input to a photodiode 42, the output of which is converted into a binary serial signal 44 by a discriminator 43. The serial signal 44 is output to a control means 202. The serial signal 44 is input to the CPU 203 in the control means 202, and is recognized as individual identification information (serial number), which is stored in the storage means 208.

In this manner, the image forming apparatus main body identifies each individual process cartridge, and can determine if the attached process cartridge is a new one.

Note that the storage means 208 of this embodiment comprises a nonvolatile storage means such as an EEPROM or the like, which includes a storage unit for storing the individual identification information of the process cartridge attached, and an ordered cartridge storage unit for storing the identification number of the ordered process cartridge.

When the order placement system places an order for a process cartridge to the selling agency, the CPU 203 reads out the individual identification number of that process cartridge from the storage unit, and stores it in the ordered cartridge storage unit.

Upon remaining amount detection, the CPU 203 accesses the ordered cartridge storage unit, and does not launch the order placement system when the stored individual identification number matches that of the process cartridge.

Figure 13:
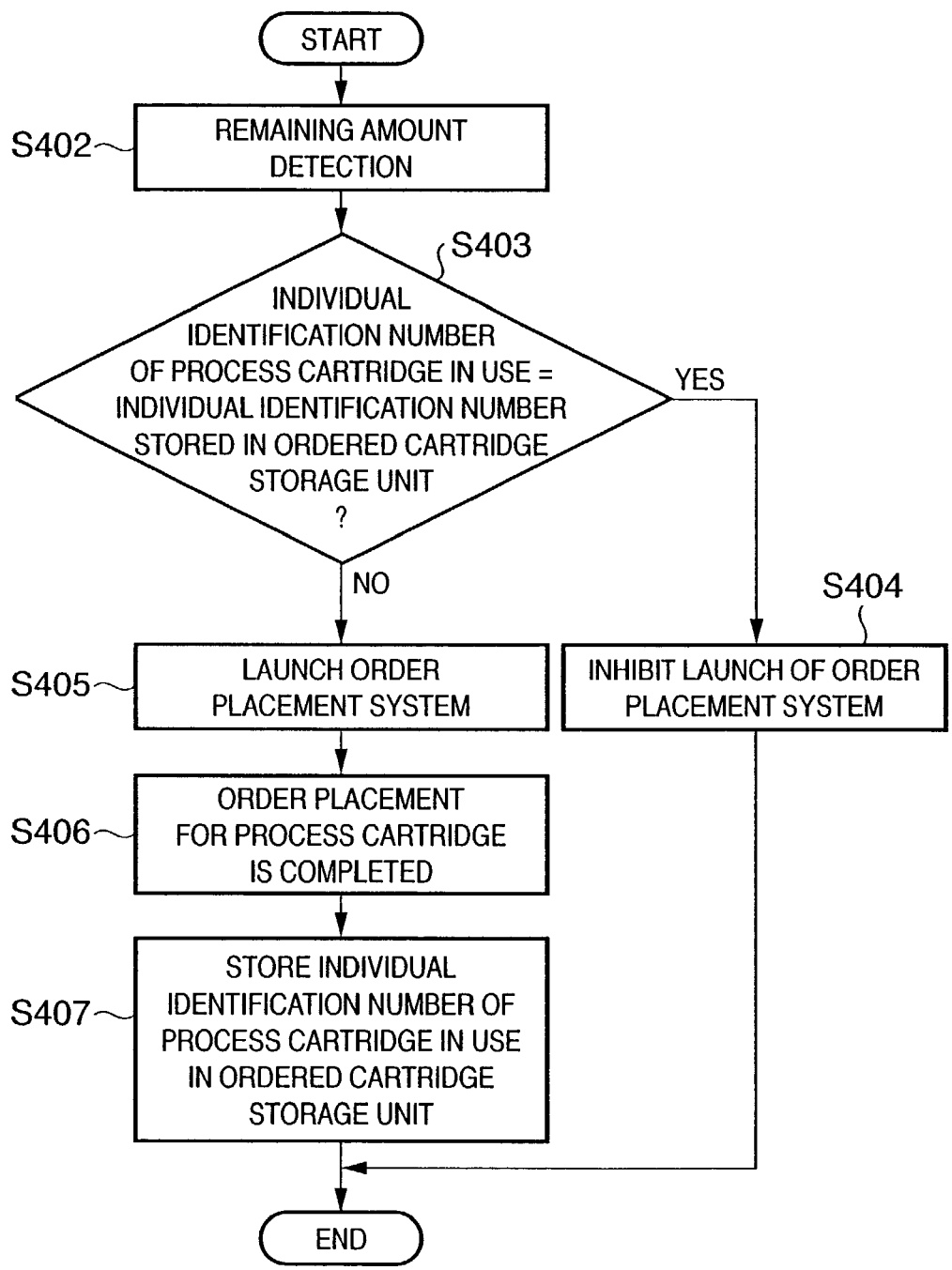
FIG. 13 is a flow chart showing the operation associated with remaining amount detection according to the fourth embodiment.

The process associated with remaining amount detection of this embodiment will be described below with reference to the flow chart in FIG. 13. When the power switch of the image forming apparatus main body is turned on or when a process cartridge is attached to the image forming apparatus main body, aging is done as a preparation for image formation, and the aforementioned individual identification detection is made at that time. The processes in respective steps in the flow chart of FIG. 13 are implemented when a CPU provided to the image forming apparatus loads a program stored in a nonvolatile storage means, and executes processes based on the loaded program code.

If the remaining amount detection works in a process cartridge which is in use (step S402), the CPU of the image forming apparatus main body checks if the individual identification information of the process cartridge in use matches that stored in the ordered cartridge storage unit (step S403). If the two pieces of information match, the CPU does not launch the order placement system (step S404).

On the other hand, if the two pieces of information do not match, the CPU launches the order placement system (step S405). After the user places an order for a process cartridge to the selling agency according to the system, and the image forming apparatus main body receives order placement complete information (step S406), the CPU stores the individual identification number of that process cartridge in the ordered cartridge storage unit (step S407).

If it is determined in step S403 that the remaining amount detection is redone in the single process cartridge, the order placement system is not launched. In the above description including step S403, each individual identification information of the process cartridge which is in use in the image forming apparatus is recognized by reading a barcode attached to the process cartridge. However, the present invention is not limited to this, and the flow chart in FIG. 13 may be modified to, e.g., read individual identification information stored in a nonvolatile storage means provided to the process cartridge.

As described above, according to this embodiment, each individual toner container or process cartridge attached to the image forming apparatus main body is identified, and whether or not an order has been placed can be easily confirmed for each toner container or process cartridge. Hence, redundant orders for an identical toner container or process cartridge can be prevented.

Fifth Embodiment

The fifth embodiment of an order placement system of an image processing apparatus according to the present invention will be described below. In the following description, features of this embodiment will be mainly explained, and a description of the same parts as in the first to fourth embodiments will be omitted.

In this embodiment, a pixel count process is executed, and the pixel count value is compared with a reference value to see if the order placement system is to be launched as in the above embodiments. In this case, the pixel count process starts when the order placement system has completed order placement for an expendable.

This is for the following reason. That is, the order placement system is launched when the remaining amount detection works for the first time. However, when the user forgets to place an order for an expendable at that time or elects not to do so, the order placement system must be launched when the remaining amount detection works again upon reusing the identical expendable.

This embodiment allows the user to place an order for expendables in bulk, and the order placement system includes a stock count monitor setup. When the user makes such setup, an order for expendables can be placed by collating with a threshold value of a stock count, and the stock count is decremented upon completion of order placement for expendables.

Since the toner remaining amount detection means, the pixel count means, and the reference value used upon determining the presence/absence of necessity of launch of the order placement system are implemented by the same mechanism as in the above embodiments, a detailed description thereof will be omitted.

The order placement system is launched from either the image forming apparatus main body or host computer, and executes an order placement procedure with the order-receiving side server via the network.

When the image forming apparatus main body has an IP address and places an order via communications with the order-receiving side server, the pixel count value is reset to zero when the image forming apparatus main body receives order placement complete information. On the other hand, when the host computer places an order via communications with the order-receiving side server, the host computer that receives order placement complete information automatically transfers that information to the image forming apparatus main body, and the image forming apparatus that receives the information resets the pixel count value to zero.

The process associated with remaining amount detection of this embodiment will be explained below with reference to the flow chart in FIG. 14. Note that processes in respective steps in the flow chart shown in FIG. 14 are implemented when a CPU provided to the image forming apparatus or information processing apparatus loads a program stored in a nonvolatile storage means, and executes processes based on the loaded program code.

Figure 14:
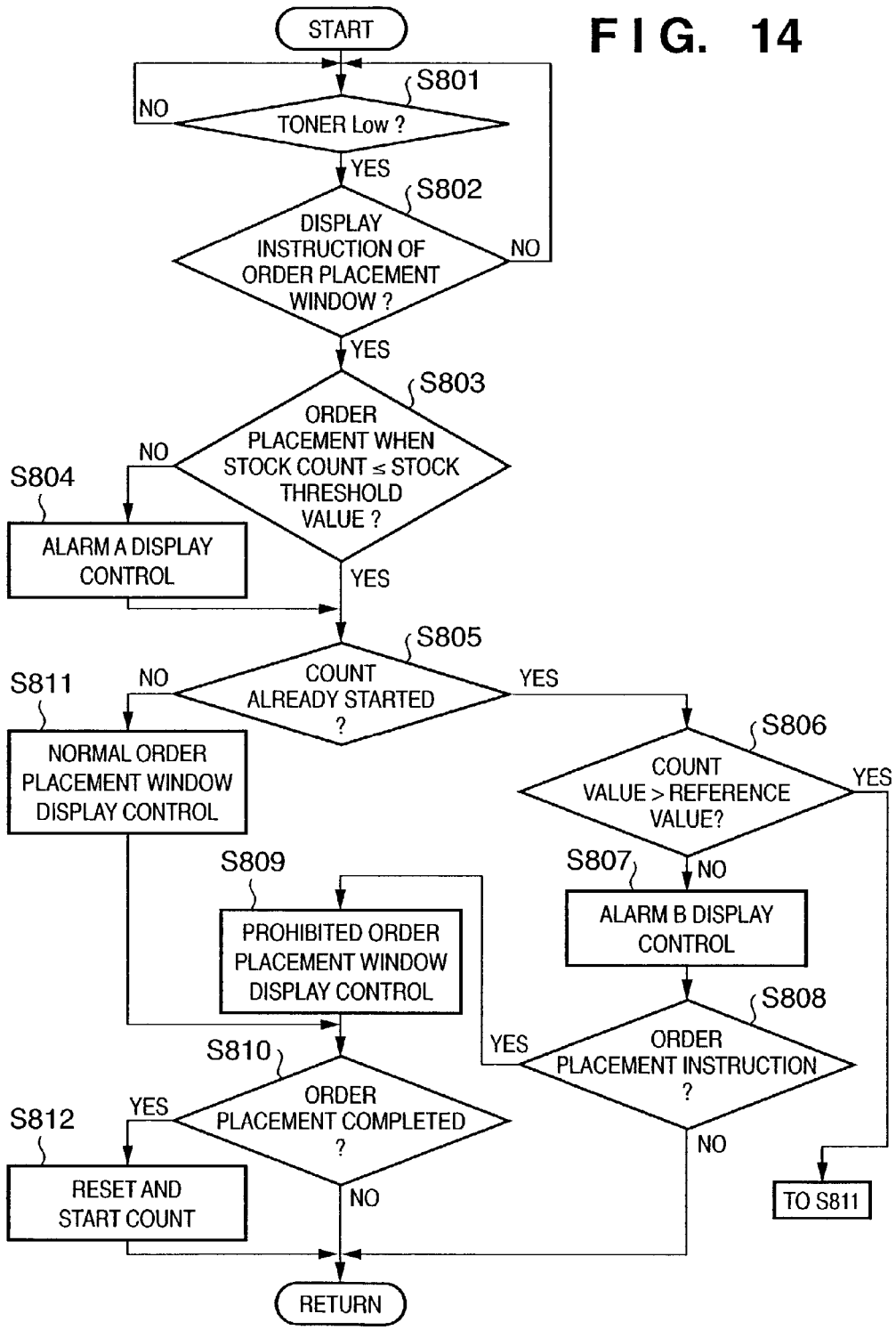
FIG. 14 is a flow chart showing the operation associated with order placement for expendables according to the fifth embodiment.

In the following description, assume that the process in FIG. 14 is one that is done in the image forming apparatus or information processing apparatus as the image processing apparatus. That is, when display windows shown in FIGS. 15A to 17 (to be described later) are displayed on the image forming apparatus main body, the process in FIG. 14 is assumed as that of the image forming apparatus; when these windows are displayed on the information processing apparatus that can communicate with the image processing apparatus, the process in FIG. 14 is assumed as that of the information processing apparatus.

It is checked in step S801 if a toner Low signal is detected. In case of the image forming apparatus, this step corresponds to a process for recognizing a signal from a recognition means such as a sensor or the like in remaining amount detection. On the other hand, in case of the information processing apparatus, this step corresponds to a process based on remaining amount information (toner Low or the like) sent from the image forming apparatus. Note that step S801 may be omitted and, in such case, the process in FIG. 14 starts from step S802.

It is then checked in step S802 if a display instruction signal is input to the apparatus in response to a message that asks if an order placement window, which is displayed upon recognition of the toner Low signal in step S801, is to be displayed.

Also, step S802 is assumed as a process for checking if a display instruction is input to an order placement sheet window shown in FIG. 16A (to be described later). In such case, the display instruction of an order placement window included in one function of an order placement means may be made based on an instruction via a pointing device such as a mouse, keyboard, or the like, or based on a user's instruction via a liquid crystal input screen.

If YES in step S802, the flow advances to step S803 to check if the stock count upon an order placement instruction is equal to or smaller than a stock threshold value. This process is done to prevent unnecessary orders by user's mistake although there is a large stock.

If YES in step S803, the flow advances to step S805; otherwise, the flow advances to step S804.

In step S804, a process for displaying an alarm indicating that the stock count is larger than the stock threshold value is executed. FIG. 15A shows an example of the alarm display. Note that stock management control will be described in detail later.

It is checked in step S805 if a count process (e.g., a pixel count process) for estimating the use amount of an expendable has already been started. Since the count process is started by the same mechanism as that which has been explained using FIGS. 5A and 5B in the first embodiment, a detailed description thereof will be omitted.

If NO in step S805, the flow advances to step S811; otherwise, the flow advances to step S806.

It is checked in step S806 if the count value has exceeded a reference value (see FIGS. 5A and 5B). If NO in step S806, the flow advances to step S807, and an alarm indicating that the current order is not so long after the previous order (FIG. 15B) or consumption of an expendable is smaller than a predetermined amount is displayed. Note that the reference value of the count value is the same as that described using FIGS. 5A and 5B in the first embodiment, and a detailed description thereof will be omitted.

It is checked in step S808 if an instruction input to a button 901 in FIG. 15B is made to display the order placement window. If YES in step S808, the flow advances to step S809; otherwise, the flow returns to step S801 to cancel an order placement process.

In step S809, it is determined that an order placement instruction is issued at an inappropriate timing, which is not a timing at which an order is to be placed, and control is made to display an order placement window that has undergone a prohibition process.

Note that the prohibition process indicates control for disabling designation of an order quantity via the order placement window and an actual order placement request instruction via a communication line. For example, as the prohibition process, the user interface may be controlled to a state wherein no check mark is put on a field 1001 shown in FIG. 16A, so as to disable inputs, or a grayout display control process (fields 1101 and 1102 in FIG. 17) may be executed to disable inputs while displaying the window so that the user can identify that inputs are invalid.

More specifically, the prohibition process is executed in accordance with item contents on the order placement window (for example, for items which are directly associated with orders such as an order quantity 1004 and order content confirmation 1002 shown in FIG. 16A).

Conversely, the user interface control process is executed so that items, which are not directly associated with orders (e.g., a detail setup button 1003 in FIG. 16A or items shown in FIG. 16B), can undergo a user's setup change process as needed without any prohibition process.

In FIG. 16A, by putting a "check mark" on the field 1001, inputs to respective items on the order placement window can be enabled so as to cope with user's irregular or some urgent order placement. Note that the "check mark" is put on the field 1001 in FIG. 16A.

In step S811, a process for displaying a normal order placement window which does not undergo any prohibition process is executed. The control without any prohibition process indicates control of the order placement window so that a check mark is put in advance on the field 1001 in FIG. 16A, i.e., an input of an order quantity and an instruction input of an actual order placement request are enabled.

It is checked in step S810 if order placement is complete. If YES in step S810, a process for resetting the count value (pixel count value) to zero and restarting the count process from zero is executed in step S812, as in the description of the first embodiment. Note that the process for resetting the count value to zero may correspond to a process for determining the current count value as a start point in this embodiment as well as the first embodiment.

As described above, according to the flow chart shown in FIG. 14, data associated with image formation is accumulated to have a timing associated with order placement as a trigger as in step S812, and the operations of the order placement means (order placement window) in steps S807, S809, and the like can undergo display control on the basis of the accumulated value, thus avoiding user's order errors more reliably.

Furthermore, the validity/invalidity of a predetermined function of the order placement means can be controlled depending on whether or not the value accumulated by an accumulation means is equal to or larger than a predetermined value.

Moreover, since both the stock count and accumulated value are checked in the processes in steps S803 and S805, order errors can be avoided.

In addition, as a developed form of FIG. 14, if the count reset & restart process in step S812 is managed together with identification information of each expendable by the process in step S806, the flow chart in FIG. 14 can be executed for each expendable. For example, information used to identify each expendable may be stored in a memory tag equipped in that expendable.

An accumulated value is held in correspondence with the identification information of each expendable, and the display control of each order placement window is made based on the held accumulated value.

Whether or not order placement is complete may be determined in step S810 upon receiving order placement complete status from the order-receiving side server, or upon receiving an input instruction of an order placement instruction button on a window (not shown) which is displayed in response to an input instruction (depression or clicking) to the order content confirmation 1002 in FIG. 16A.

Details of the order placement user interface (order placement window) will be described below.

FIGS. 16A and 16B show an example of display windows displayed upon selecting an order placement sheet included in a printer driver user interface. The same object is achieved when the user interface function shown in FIG. 16A or 16B is provided to a given portion of an Internet Web page based on HTML or XML, or to a printer status monitor utility. For example, a predetermined portion on the display window shown in FIG. 16A or 16B or FIG. 17 as the printer driver user interface may contain the address (URL) of a Web page, and when an input instruction is made to the address, a window corresponding to FIG. 16A or 16B or FIG. 17 may be displayed as a Web page.

When the flow chart shown in FIG. 14 is executed by the image forming apparatus main body, these windows correspond to those which are displayed on a display unit provided to the image forming apparatus.

Reference numeral 1001 denotes an input field used to instruct whether or not an input instruction to the order placement sheet is enabled, and a default setup is determined depending on whether or not the aforementioned prohibition process has been done.

Note that a function of accepting a setup input of user's choice from the default setup is provided, and a user's instruction input is accepted independently of ON/OFF of the prohibition process described using FIG. 14. For example, an instruction input to the detail setup button 1003 is controlled to be always accepted as in the field 1001.

Reference numeral 1003 denotes a "detail setup" instruction button, and the stock count and stock threshold value can be arbitrarily set on a window displayed upon depression of this button. When the button 1003 is pressed, the user interface shown in FIG. 16B is displayed.

Reference numerals 1007 and 1008 denote fields used to display the image forming apparatus name (product name) and the model number of an expendable. Product name information stored in a corresponding printer driver program, which is stored in the image forming apparatus main body or information processing apparatus, is acquired, and the product name is displayed on the field 1007 based on the acquired information.

Also, the model number of an expendable is displayed on the field 1008 on the basis of information specified by looking up a table in which the model number of an expendable is assigned in correspondence with the product in the field 1007. This table may be stored in advance in the apparatus main body (image forming apparatus or information processing apparatus), or may be downloaded from an external apparatus to the apparatus main body.

Upon placing an order on the order placement window in FIG. 16, a confirmation list (not shown) of order contents is displayed by pressing the "order content confirmation" button, and order placement is complete by pressing an "order" button (not shown) after the user confirms the order contents.

On the detail setup window shown in FIG. 16B, the current stock count and stock threshold value can be input, and information set on this window is referred to in the process of step S803 or the like in FIG. 14 and is used in checking processes.

A setup means for setting an order destination is equipped. On the window shown in FIG. 16A, predetermined order destination information (order information destination) is set as a default value, but this information can be changed as needed according to a user's instruction, and the setup value is held.

The stock count management control will be explained below. Note that the stock count to be managed is referred to in the process of step S803 or the like in FIG. 14.

More specifically, stock count management control is implemented by monitoring the interval between toner Low (status corresponding to the insufficient remaining amount of an expendable) signals when a toner Low signal in step S801 is recognized a plurality of times by the image forming apparatus or the information processing apparatus which can communicate with the image forming apparatus.

For example, when the generation interval between a toner Low signal at a predetermined timing and a previous toner Low signal is equal to or larger than an interval required to accumulate a predetermined pixel count value or more, it is recognized that the current toner Low signal is generated based on the remaining amount of a new process cartridge, the stock count data is decremented by 1, and the display contents of the stock count in FIG. 16B are also decremented by 1.

On the other hand, when the generation interval between a toner Low signal at a predetermined timing and a previous toner Low signal is smaller than the interval required to accumulate a predetermined pixel count value or less, it is determined that these toner Low signals are generated based on the remaining amount of the identical process cartridge, and the stock count is inhibited from being decremented. For example, when the user detaches the cartridge that generated the toner Low signal from the image forming apparatus, and shakes it several times, toner Low status can be canceled temporarily, but another toner Low signal may be generated soon. In such case, the aforementioned phenomenon can occur.

In order to determine if a newly generated toner Low signal is based on the remaining amount of a new or old process cartridge, the print count, print execution time, and power ON/OFF switching count may be used as parameters in addition to the method of determining the interval between the current and previous toner Low signals using the pixel count value as a parameter.

For example, when the print count is used as a parameter, a known sheet counter for measuring the print count is provided to the image forming apparatus or information processing apparatus.

When the time is used as a parameter, a timer for measuring time is provided to the image forming apparatus or information processing apparatus.

As stock count management control, for example, the apparatus (image forming apparatus/information processing apparatus) determines whether or not launch of the order placement system is inhibited, as has been explained using FIGS. 5A and 5B, and the stock count is decremented when the inhibited state of launch of the system is canceled.

With the above-mentioned flow, whether or not an order is placed in consideration of the stock count can be confirmed. Hence, the user can be prevented from placing an order although he or she has a large stock, and a redundant order upon completion of order placement.

When the flow chart shown in FIG. 14 is implemented, the user can place an order at an arbitrary timing, and can be adequately prevented from placing redundant orders.

Modification

In the above description, a monochrome (black toner) cartridge is assumed as a toner cartridge, i.e., an expendable. However, the present invention is not limited to this. For example, the present invention can be applied to a color electrophotography printer or ink-jet printer, which comprises four-color, Y, M, C, and K expendable cartridges.

In such case, the flow chart shown in FIG. 14 is executed for each type of expendable (for each color expendable cartridge), and the count process that has been explained using FIGS. 5A and 5B is done for each type of expendable to obtain pixel count values for respective types of expendables.

Figure 17:
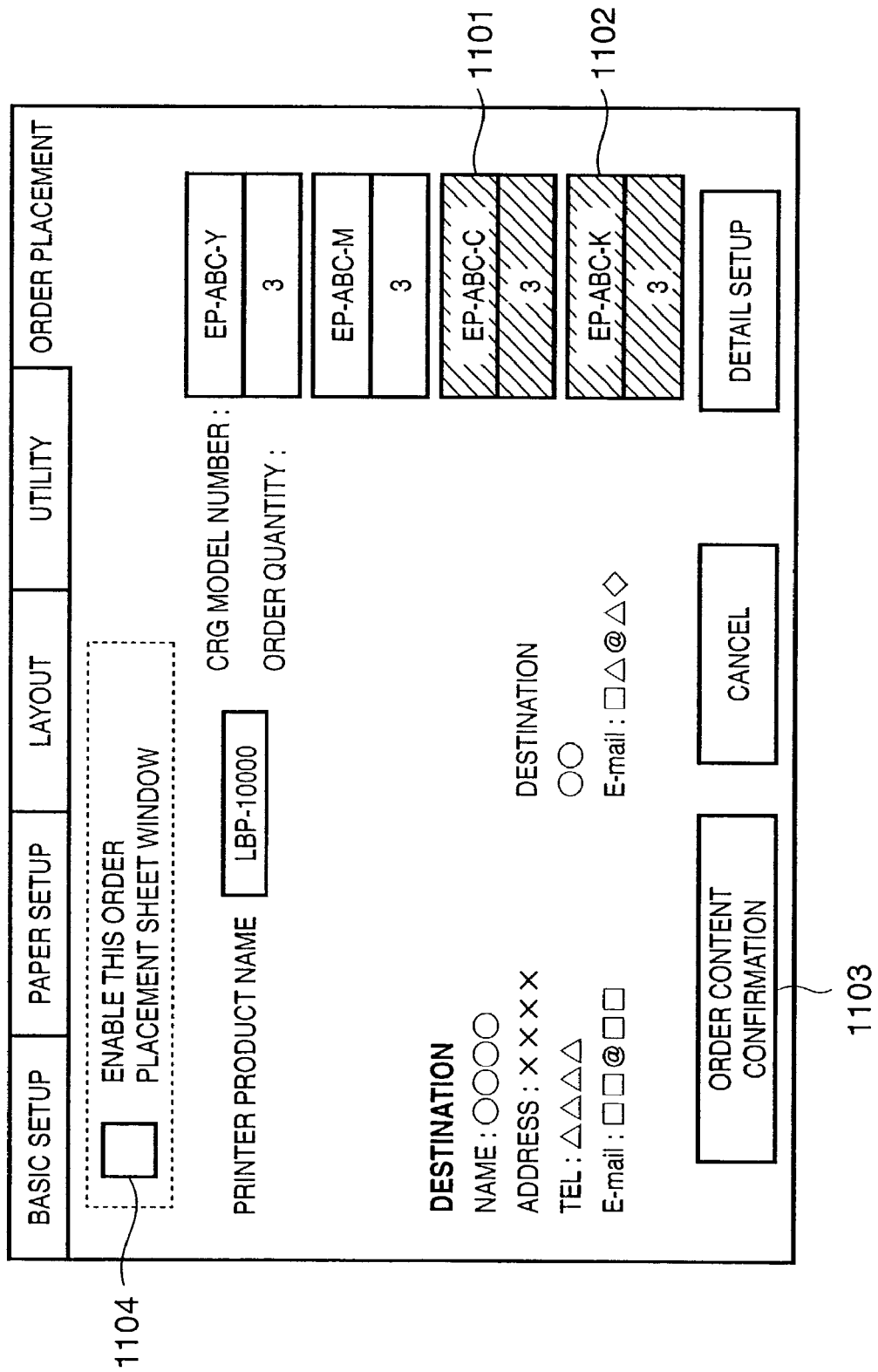
FIG. 17 shows an example of a setup window used to place an order for expendables in a modification of the fifth embodiment.

FIG. 17 shows an example of an order placement window upon controlling the order placement window for a plurality of types of expendables.

FIG. 18 shows an example of reference information of pixel count values for respective colors, which are referred to by a controller (a CPU of the image forming apparatus or information processing apparatus) when the prohibition process is to be applied to the order placement window shown in FIG. 17.

For example, if "10000" is set as the reference value in step S806 in FIG. 14, since the count values for C and K expendables do not exceed the reference value, items on the order placement window associated with C and K cartridges undergo the prohibition process shown in FIG. 17.

In FIG. 18, a pixel count value is adopted as a count value. As described above, when the print count or time is adopted as the count value, information similar to the reference information shown in FIG. 18 is used. For example, when time information is used as a count value, if a time longer than an appropriate reference value is not accumulated as information shown in FIG. 18, the prohibition process is applied, as indicated by the fields 1101 and 1102.

Also, information similar to reference information shown in FIG. 18 may be used upon checking if the count value exceeds the reference value in the first embodiment. In such case, the count value for only K is held as reference information.

Note that the fields 1101 and 1102 shown in FIG. 17 undergoes grayout display control to disable inputs, i.e., not to accept inputs from the keyboard, mouse, or the like.

By inputting an instruction (check mark or the like) to a field 1104, inputs to the fields 1101 and 1102 that have undergone the prohibition process are enabled. When the prohibition process is applied to some of a plurality of types of expendables, control shown in FIG. 17 is made as a default setup of the field 1104.

Also, an input instruction to a button 1103 is valid in FIG. 17. In response to the input instruction to the button 1103, an order content confirmation window is displayed, and order information is sent to the order destination. This process is the same as that in FIG. 16A or 16B. As in FIG. 16A, stock counts and stock threshold values for respective types of expendables can be set by an input instruction to a "detail setup" button in FIG. 17. Note that each stock count is decremented by executing the mechanism that has been explained using FIGS. 16A and 16B for each type of expendable, and a detailed description thereof will be omitted.

As a feature of FIG. 17 which is different from those explained using FIGS. 16A and 16B, order information is generated so that the order confirmation contents do not contain order contents associated with the items (corresponding to the types of expendables) that have undergone the prohibition process (e.g., the fields 1101 and 1102).

When order information associated with the fields 1101 (EP-ABC-C) and 1102 (EP-ABC-K) is generated, and is included in the order contents, the order placement sheet can be enabled by putting a check mark on the field 1104.

Furthermore, unlike in FIGS. 16A and 16B, when the prohibition process is applied to all the types of expendables, an input instruction to the order content confirmation button 1103 (corresponding to transmission of order information to the order destination) is also disabled.

When the order placement window in FIG. 17 and prohibition control for the order placement window are implemented in this manner, even when there are plurality of types of expendables, the user can be prevented from placing redundant orders or order errors, and can reliably place an order for expendables of the required types.

In the above description, the display control of the order placement window (FIGS. 16A and 16B and FIG. 17) is made on the basis of the accumulated value of the accumulation means (count means). However, the present invention is not limited to such specific display control based on the accumulated value (e.g., the aforementioned pixel count value) of the accumulation means. For example, flags indicating whether or not order placement is complete may be assigned in correspondence with respective types of expendables, and the display control shown in FIGS. 16A and 16B and FIG. 17 may be made with reference to these flags.

For example, each expendable unit may comprise a memory tag that stores at least identification information of the expendable, a history flag (order history information) indicating whether or not an order has already been placed may be held in correspondence with the identification information, and that flag may be stored in that memory tag, a storage unit of the image forming apparatus or information processing apparatus, or the like.

More specifically, the process in step S805 in FIG. 14 is replaced by a process for checking if an order flag is ON (ordered) in correspondence with identification information corresponding to a given expendable. If YES in this step, the flow advances to step S807. Also, the process in step S812 is replaced by a process for setting the flag OFF (unordered). In this manner, data associated with image formation is held to have a timing associated with order placement as a trigger, and different display control of the order placement window can be made on the basis of the held data (order placement complete flag for each type). Of course, even when such aspect is adopted, the respective processes of the image processing apparatus explained in the first embodiment to the fifth embodiment as well as its modification are executed in the same manner as in the case wherein the accumulated value is referred to.

Another Embodiment

In the above embodiments, order placement for a process cartridge that includes toner and a developing device of a printer which records information according to electrophotography has been exemplified. Also, the present invention can be applied to order placement of developing agents of printers which record information according to various other schemes.

In the above embodiments, as a method of replenishing a developing agent, a cartridge that stores a developing agent is replaced. Also, the present invention can be applied to a replenishment method of supplying a developing agent stored in a given container into a cartridge.

The present invention can be widely applied to order placement for expendables of electronic apparatuses including office equipment other than printers.

Furthermore, in the above embodiments, a process cartridge that stores a print agent such as toner as an expendable has been exemplified. However, the present invention is not limited to this. For example, the present invention can be applied to a transfer unit including the transfer means 107, a fixing device unit including the fixing device 109, and the like. That is, when the image forming apparatus recognizes that the transfer unit or fixing device unit is used by a predetermined amount, an order placement process is launched, and a process for accumulating predetermined specific data and storing it in a nonvolatile storage means is executed. At this time, the aforementioned pixel count value, print count, and the like may be used as the specific data. Also, the nonvolatile storage means may be equipped in either the image forming apparatus or expendable, as described above. The image forming apparatus executes the same process as that described above on the basis of data stored in the nonvolatile storage means. In this way, the present invention can be applied to every expendables used in the image forming apparatus, and can smoothly place orders for expendables used in the image forming apparatus without placing redundant orders.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). For example, when the present invention is applied to a personal computer (to be referred to as a host hereinafter), the processes in respective steps shown in FIGS. 5A and 5B and FIGS. 8, 13, and 14 are executed by the host. In such case, the processes in step S601 in FIG. 8, step S402 in FIG. 13, and step S801 in FIG. 14 correspond to detection of an insufficient remaining amount when the host recognizes information which is received from the image forming apparatus and is used to specify the remaining amount of an expendable. In this manner, when the host executes the processes, the load on the image forming apparatus can be reduced, and programs used to execute processes in FIGS. 5A and SB and FIGS. 8, 13, and 14 in the host computer can be upgraded more easily than the image forming apparatus or the like.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIGS. 8, 10, 13 and/or FIG. 14) are to be stored in the storage medium.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus which comprises an order placement unit for executing an operation associated with order placement of an expendable used in an image forming apparatus, comprising:
    an accumulation unit to accumulate data associated with image formation in accordance with print operation of said image forming apparatus, the accumulation unit being started from a timing associated with an order placement as a trigger; and
    an order placement control unit to control the operation of the order placement unit on the basis of a value of the data accumulated by said accumulation unit,
    wherein the operation of the order placement unit includes a display operation of an order placement window, and
    wherein said order placement control unit controls the display operation of the order placement window to disable a repetitive order placement based on the order placement which is the trigger, if the value accumulated by said accumulation unit is less than a predetermined value.

2. The apparatus according to claim 1, wherein the timing associated with the order placement is a timing at which a remaining amount of the expendable becomes not more than a predetermined amount, and said apparatus further comprises a determination unit for determining an accumulation start point of said accumulation unit in accordance with information indicating that the remaining amount of the expendable becomes not more than the predetermined amount.

3. The apparatus according to claim 1, wherein the timing associated with the order placement is a timing at which completion of order placement is recognized, and said apparatus further comprises a determination unit for determining an accumulation start point of said accumulation unit in accordance with information indicating that completion of order placement is recognized.

4. The apparatus according to claim 1, wherein the control of the operation of the order placement unit includes a process for determining whether order placement is inhibited or permitted.

5. The apparatus according to claim 1, wherein said order placement control unit controls to enable order placement window functions if the value accumulated by said accumulation unit is not less than the predetermined value.

6. The apparatus according to claim 1, further comprising a stock count monitor unit for monitoring a stock count, and wherein said order placement control unit controls launch of order placement on the basis of the stock count monitored by said stock count monitor unit, and the value accumulated by said accumulation unit.

7. The apparatus according to claim 1, wherein said image forming apparatus uses a plurality of types of expendables,
    said accumulation unit accumulates the data for respective types of expendables, and
    said order placement control unit controls the operation of the order placement unit associated with an expendable of a corresponding type on the basis of each accumulated value.

8. The apparatus according to claim 1, wherein the data associated with image formation is a pixel count value or print count.

9. A method of placing an order for an expendable in an image processing apparatus which comprises an order placement unit for executing an operation associated with order placement of an expendable used in an image forming apparatus, comprising:
   the accumulation step of accumulating data associated with image formation in accordance with print operation of the image forming apparatus, the accumulation step being started from a timing associated with an order placement as a trigger; and
   the order placement control step of controlling the operation of the order placement unit on the basis of a value of the data accumulated in the accumulation step,
   wherein said order placement control step includes a display operation of an order placement window, and
   wherein said order placement control step controls the display operation of the order placement window to disable a repetitive order placement based on the order placement which is the trigger, if the value accumulated in said accumulation step is less than a predetermined value.

10. The method according to claim 9, wherein the timing associated with the order placement is a timing at which a remaining amount of the expendable becomes not more than a predetermined amount, and said method further comprises the determination step of determining an accumulation start point of the accumulation step in accordance with information indicating that the remaining amount of the expendable becomes not more than the predetermined amount.

11. The method according to claim 9, wherein the timing associated with the order placement is a timing at which completion of order placement is recognized, and said method further comprises the determination step of determining an accumulation start point of the accumulation step in accordance with information indicating that completion of order placement is recognized.

12. The method according to claim 9, wherein the control of the operation of the order placement unit includes a process for determining whether order placement is inhibited or permitted.

13. The method according to claim 9, wherein the order placement control step includes the step of controlling to enable/disable order placement window functions if the value accumulated in the accumulation step is not less than the predetermined value.

14. The method according to claim 9, further comprising the stock count monitor step of monitoring a stock count, and wherein the order placement control step includes the step of controlling launch of order placement on the basis of the stock count monitored in the stock count monitor step, and the value accumulated in the accumulation step.

15. The method according to claim 9, wherein the image forming apparatus uses a plurality of types of expendables,
   the accumulation step includes the step of accumulating the data for respective types of expendables, and
   the order placement control step includes the step of controlling the operation of the order placement unit associated with an expendable of a corresponding type on the basis of each accumulated value.

16. The method according to claim 9, wherein the data associated with image formation is a pixel count value or print count.

17. A computer program for making a computer execute a method of placing an order for an expendable in an image processing apparatus which comprises an order placement unit for executing an operation associated with order placement of an expendable used in an image forming apparatus, having program codes corresponding to steps comprising:
   the accumulation step of accumulating data associated with image formation in accordance with print operation of the image forming apparatus, the accumulation step being started from a timing associated with an order placement as a trigger; and
   the order placement control step of controlling the operation of the order placement unit on the basis of a value of the data accumulated in the accumulation step,
   wherein said order placement control step includes a display operation of an order placement window, and
   wherein said order placement control step controls the display operation of the order placement window to disable a repetitive order placement based on the order placement which is the trigger, if the value accumulated in said accumulation step is less than a predetermined value.

18. A storage medium that stores a computer program for making a computer execute a method of placing an order for an expendable in an image processing apparatus which comprises an order placement unit for executing an operation associated with order placement of an expendable used in an image forming apparatus, said medium storing program codes corresponding to steps comprising:
   the accumulation step of accumulating data associated with image formation in accordance with print operation of the image forming apparatus, the accumulation step being started from a timing associated with an order placement as a trigger; and
   the order placement control step of controlling the operation of the order placement unit on the basis of a value of the data accumulated in the accumulation step,
   wherein said order placement control step includes a display operation of an order placement window, and
   wherein said order placement control step controls the display operation of the order placement window to disable a repetitive order placement based on the order placement which is the trigger, if the value accumulated in said accumulation step is less than a predetermined value.

19. An image processing apparatus which comprises an order placement unit for executing an operation associated with order placement of an expendable used in an image forming apparatus, comprising:
   an accumulation unit for accumulating data associated with image formation in accordance with print operation of said image forming apparatus, a start of accumulation of data by said accumulation unit being triggered by a last order placement; and
   an order placement control unit for controlling (i) operation of the order placement unit based on a value of the data accumulated by said accumulation unit, and (ii) display of an order placement window,
   wherein said order placement control unit controls operation of the order placement window to disable a redundant order placement if the value of the data accumulated by said accumulation unit is less than a predetermined value.

* * * * *

UNITED STATES PATENT AND TRADEMARK OFFICE
CERTIFICATE OF CORRECTION

PATENT NO. : 7,426,482 B2  Page 1 of 1
APPLICATION NO. : 10/225244
DATED : September 16, 2008
INVENTOR(S) : Satoru Inami et al.

It is certified that error appears in the above-identified patent and that said Letters Patent is hereby corrected as shown below:

COLUMN 1
Line 10, "sumable)" should read --sumables)--.
Line 52, "remaining" should read --as remaining--.

COLUMN 13
Line 39, "as" should read --as in--.

COLUMN 15
Line 30, "aging" should read --ordering--.

COLUMN 17
Line 30, "by" should read --by a--.

COLUMN 21
Line 37, "goes" should read --go--.

COLUMN 23
Line 14, "expendables" should read --expendable--.
Line 34, "and SB" should read --and 5B--.

Signed and Sealed this

Twelfth Day of May, 2009

JOHN DOLL
*Acting Director of the United States Patent and Trademark Office*